(12) United States Patent
Kim et al.

(10) Patent No.: US 11,971,758 B2
(45) Date of Patent: Apr. 30, 2024

(54) INSERTABLE ELECTRONIC DEVICE AND METHOD FOR THE SAME

(71) Applicant: Samsung Electronics Co., Ltd., Suwon-si (KR)

(72) Inventors: Jisang Kim, Suwon-si (KR); Jinsu Kim, Suwon-si (KR); Chunsoo Lee, Suwon-si (KR); Soonin Jeong, Suwon-si (KR); Jinchul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 17/538,086

(22) Filed: Nov. 30, 2021

(65) Prior Publication Data

US 2022/0187880 A1   Jun. 16, 2022

Related U.S. Application Data

(63) Continuation of application No. PCT/KR2021/017245, filed on Nov. 23, 2021.

(30) Foreign Application Priority Data

Dec. 16, 2020   (KR) .................. 10-2020-0176811

(51) Int. Cl.
*G06F 1/18* (2006.01)
*G06F 13/40* (2006.01)

(52) U.S. Cl.
CPC ............. *G06F 1/189* (2013.01); *G06F 1/186* (2013.01); *G06F 13/4068* (2013.01)

(58) Field of Classification Search
CPC .................................. G06F 13/4068
See application file for complete search history.

(56) References Cited

U.S. PATENT DOCUMENTS 6,816,385 B1   11/2004   Alcoe
10,359,815 B1 *   7/2019   Lin ............... H01R 12/721
(Continued)

FOREIGN PATENT DOCUMENTS

JP   2002-152415 A   5/2002
JP   2018-110476 A   7/2018
(Continued)

OTHER PUBLICATIONS

Nikolas Ledoux, Breaking Ground Loops with Functional Isolation to Reduce Data Transmission Errors, Dec. 1, 2011, Technical Article MS-2256.
(Continued)

*Primary Examiner* — Henry Tsai
*Assistant Examiner* — Aurangzeb Hassan
(74) *Attorney, Agent, or Firm* — Jefferson IP Law, LLP

(57) ABSTRACT

A communication device insertable into an external electronic device is provided. The communication device includes a converter circuit, a power line, a first conductor connected to the power line, and at least one second conductor electrically disconnected from the first conductor and connected to a ground, the first conductor being electrically connected to the at least one second conductor by fastening between the communication device and the external electronic device, a signal line, and a control circuit connected to the power line, the first conductor, and the signal line, wherein the control circuit is configured to receive a first signal from a processor of the external electronic device through the signal line, receive a second signal generated based on a discharging of a power flowing along the power line to the ground through the at least one second conductor when the first conductor is electrically connected to the at least one second conductor, and output, based on the first
(Continued)

signal and the second signal, a control signal to the converter circuit for controlling the converter circuit.

18 Claims, 20 Drawing Sheets

(56) References Cited

U.S. PATENT DOCUMENTS

| | | | |
|---|---|---|---|
| 10,394,298 B1* | 8/2019 | Chang | G06F 13/42 |
| 10,488,893 B1* | 11/2019 | Keilers | G06F 1/186 |
| 10,678,473 B2* | 6/2020 | Lim | G06F 3/0653 |
| 10,719,435 B2* | 7/2020 | Lim | G06F 12/0246 |
| 2001/0038547 A1 | 11/2001 | Jigour et al. | |
| 2002/0089399 A1 | 7/2002 | Massey et al. | |
| 2004/0166707 A1 | 8/2004 | Kodera et al. | |
| 2004/0235324 A1 | 11/2004 | Kimura et al. | |
| 2005/0287847 A1 | 12/2005 | Kamata et al. | |
| 2007/0128897 A1 | 6/2007 | Kikuchi | |
| 2013/0342996 A1 | 12/2013 | Fricker | |
| 2014/0268915 A1 | 9/2014 | Kong et al. | |
| 2015/0325952 A1 | 11/2015 | McCracken et al. | |
| 2016/0118121 A1* | 4/2016 | Kelly | G06F 1/28 710/301 |
| 2016/0204594 A1 | 7/2016 | Su et al. | |
| 2016/0246747 A1 | 8/2016 | Rand et al. | |
| 2017/0137608 A1 | 5/2017 | Stoppelmann | |
| 2017/0137609 A1 | 5/2017 | Stoppelmann | |
| 2017/0358922 A1 | 12/2017 | Bacon et al. | |
| 2018/0356865 A1* | 12/2018 | Chang | G06F 1/185 |
| 2019/0058321 A1 | 2/2019 | Okajima | |
| 2019/0067887 A1 | 2/2019 | Ronchi et al. | |
| 2019/0103656 A1 | 4/2019 | Shi et al. | |
| 2019/0391944 A1* | 12/2019 | Seiler | G06K 19/07732 |
| 2020/0194928 A1 | 6/2020 | Yeo et al. | |
| 2021/0157763 A1* | 5/2021 | Jabori | G06F 13/385 |
| 2021/0195745 A1* | 6/2021 | Chang | H05K 1/144 |
| 2021/0294760 A1* | 9/2021 | Mori | G06F 13/385 |
| 2021/0390272 A1 | 12/2021 | Yang | |

FOREIGN PATENT DOCUMENTS

| | | |
|---|---|---|
| KR | 10-2002-0038480 A | 5/2002 |
| KR | 10-2002-0080470 A | 10/2002 |
| KR | 10-2004-0076806 A | 9/2004 |
| KR | 10-2004-0092361 A | 11/2004 |
| KR | 10-2006-0049700 A | 5/2006 |
| KR | 10-2006-0086165 A | 7/2006 |
| KR | 10-2007-0060022 A | 6/2007 |
| KR | 10-0949985 B1 | 3/2010 |
| KR | 10-1178315 B1 | 8/2012 |
| KR | 10-2014-0113468 A | 9/2014 |
| KR | 10-2015-0017635 A | 2/2015 |
| KR | 10-2015-0031297 A | 3/2015 |
| KR | 10-2016-0148709 A | 12/2016 |
| KR | 10-2017-0056463 A | 5/2017 |
| KR | 10-2017-0056470 A | 5/2017 |
| KR | 10-2017-0120611 A | 10/2017 |
| KR | 10-2018-0132030 A | 12/2018 |
| KR | 10-2020-0041970 A | 4/2020 |
| KR | 10-2089422 B1 | 5/2020 |
| KR | 10-2020-0073478 A | 6/2020 |
| WO | 2014/194598 A1 | 12/2014 |
| WO | 2020/077550 A1 | 4/2020 |

OTHER PUBLICATIONS

International Search Report dated Feb. 25, 2022, issued in International Application No. PCT/KR2021/017245.

* cited by examiner

INSERTABLE ELECTRONIC DEVICE AND METHOD FOR THE SAME

CROSS-REFERENCE TO RELATED APPLICATION(S)

This application is a continuation application, claiming priority under § 365(c), of an International application No. PCT/KR2021/017245, filed on Nov. 23, 2021, which is based on and claims the benefit of a Korean patent application number 10-2020-0176811, filed on Dec. 16, 2020, in the Korean Intellectual Property Office, the disclosure of which is incorporated by reference herein in its entirety.

BACKGROUND

Field

The disclosure relates to an insertable electronic device and a method for operating the same.

Description of Related Art

Various kinds of electronic devices are widely used by consumers in modern times.

An electronic device may have a physical structure (for example, slot, socket, or connector) into which insertable devices (or modules) supporting a specific function (for example, communication function) can be inserted. An electronic device, when an insertable device is inserted therein, may be electrically connected to the insertable device and may use a specific function supported by the insertable device.

There have recently been increasing demands for insertable devices providing various functions for electronic devices, and there is thus a need to implement a technology for securing stability of insertable devices inserted into electronic devices.

The above information is presented as background information only to assist with an understanding of the disclosure. No determination has been made, and no assertion is made, as to whether any of the above might be applicable as prior art with regard to the disclosure.

An insertable electronic device (for example, communication module based on M.2 standard) may be inserted into a slot of another electronic device (for example, note personal computer (PC)) (hereinafter, referred to as host device). When an insertable electronic device remains inserted into a slot of a host device, the insertable electronic device may be fastened to the substrate (for example, main board) of the host device by a fastening member (for example, screw). A ground pad implemented on the substrate of the insertable electronic device contacts a ground pad formed on the substrate of the host device as a result of fastening, and electric stability of an operation for a specific function (for example, $5^{th}$ generation (5G) communication) supported by the insertable electronic device may be secured as a result of electric connection between the ground pads resulting from the contact. However, if the insertable electronic device is abnormally fastened by the fastening member, thereby failing to secure contact between the ground pad of the insertable electronic device and the ground pad of the host device, operation degradation (for example, signal quality degradation) may occur due to the failure to secure electric stability of the insertable electronic device.

Aspects of the disclosure are to address at least the above-mentioned problems and/or disadvantages and to provide at least the advantages described below. According to various embodiments, an electronic device and a method for operating the same may use a control circuit implemented to detect whether or not an insertable electronic device is fastened to a host device such that, according to whether or not the fastening is detected, the insertable electronic device is controlled to perform an operation, thereby securing electric stability of the insertable electronic device. In addition, according to various embodiments, an electronic device and a method for operating the same may use a control circuit implemented to detect whether or not a ground pad of an insertable electronic device and a ground pad of a host device contact each other such that, according to whether or not the contact is detected, the insertable electronic device is controlled to perform an operation, thereby securing electric stability of the insertable electronic device.

Additional aspects will be set forth in part in the description which follows and, in part, will be apparent from the description, or may be learned by practice of the presented embodiments.

SUMMARY

According to various embodiments, there may be provided a communication device insertable into an external electronic device. The communication device includes a converter circuit, a power line, a first conductor connected to the power line, and at least one second conductor electrically disconnected from the first conductor and connected to a ground, the first conductor being electrically connected to the at least one second conductor by fastening between the communication device and the external electronic device, a signal line, and a control circuit connected to the power line, the first conductor, and the signal line, wherein the control circuit is configured to receive a first signal from a processor of the external electronic device through the signal line, receive a second signal generated based on a discharging of a power flowing along the power line to the ground through the at least one second conductor when the first conductor is electrically connected to the at least one second conductor, and output, based on the first signal and the second signal, a control signal to the converter circuit for controlling the converter circuit.

According to various embodiments, there may be provided a method of operating a communication device insertable into an external electronic device. The method includes receiving a first signal from a processor of the external electronic device through a signal line, receiving a second signal generated based on a discharging of a power flowing along the power line to the ground through the at least one second conductor when the first conductor is electrically connected to the at least one second conductor according to a fastening between the communication device and the external electronic, and outputting, based on the first signal and the second signal, a control signal for controlling a converter circuit to the converter circuit.

There may be provided a communication device. The communication device includes a first conductor connected to the power line, and at least one second conductor electrically disconnected from the first conductor and connected to a ground, the first conductor being electrically connected to the at least one second conductor by fastening between the communication device and the external electronic device, a signal line, and a logic circuit including a first input terminal connected to the power line and the first conductor, and a second input terminal connected to the signal line, wherein the logic circuit is configured to receive a first signal from a processor of the external electronic device through the first input terminal, receive a second signal through the second input terminal, and output, based on that the signal level of the second signal is a designated level, a control signal for controlling the converter circuit to the converter circuit.

According to various embodiments, there may be provided a communication device insertable into an external electronic device. The communication device includes a first substrate, a converter circuit, a power line, a first conductor disposed on the upper surface of the first substrate and connected to the power line, and at least one second conductor electrically disconnected from the first conductor and connected to a ground, the first conductor being electrically connected to the at least one second conductor by fastening between the communication device and the external electronic device, a third conductor disposed on the lower surface of the first substrate and connected to the power line, and at least one fourth conductor electrically disconnected from the third conductor and connected to the ground, the third conductor being electrically connected to the at least one fourth conductor by contact between the lower surface of the first substrate of the communication device and the upper surface of a second substrate of the external electronic device, a signal line, and a control circuit connected to the power line, the first conductor, the third conductor, and the signal line, wherein the control circuit is configured to receive a first signal from a processor of the external electronic device through the signal line, receive a second signal generated by discharging power flowing along the power line to the ground through the at least one second conductor when the first conductor is electrically connected to the at least one second conductor, receive a third signal generated by discharging power flowing along the power line to the ground through the at least one fourth conductor when the third conductor is electrically connected to the at least one fourth conductor, and output, based on the first signal and the second signal, a control signal for controlling the converter circuit to the converter circuit.

Technical solutions according to various embodiments are not limited to the above-mentioned technical solutions, and other technical solutions not mentioned herein will be clearly understood from this specification and the appended drawings by those skilled in the art to which the disclosure pertain.

Various embodiments may provide an electronic device and a method for operating the same, wherein a control circuit implemented to detect whether or not an insertable electronic device is fastened to a host device is used such that, according to whether or not the fastening is detected, the insertable electronic device is controlled to perform an operation, thereby securing electric stability of the insertable electronic device.

In addition, various embodiments may provide an electronic device and a method for operating the same, wherein a control circuit implemented to detect whether or not a ground pad of an insertable electronic device and a ground pad of a host device contact each other is used such that, according to whether or not the contact is detected, the insertable electronic device is controlled to perform an operation, thereby securing electric stability of the insertable electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
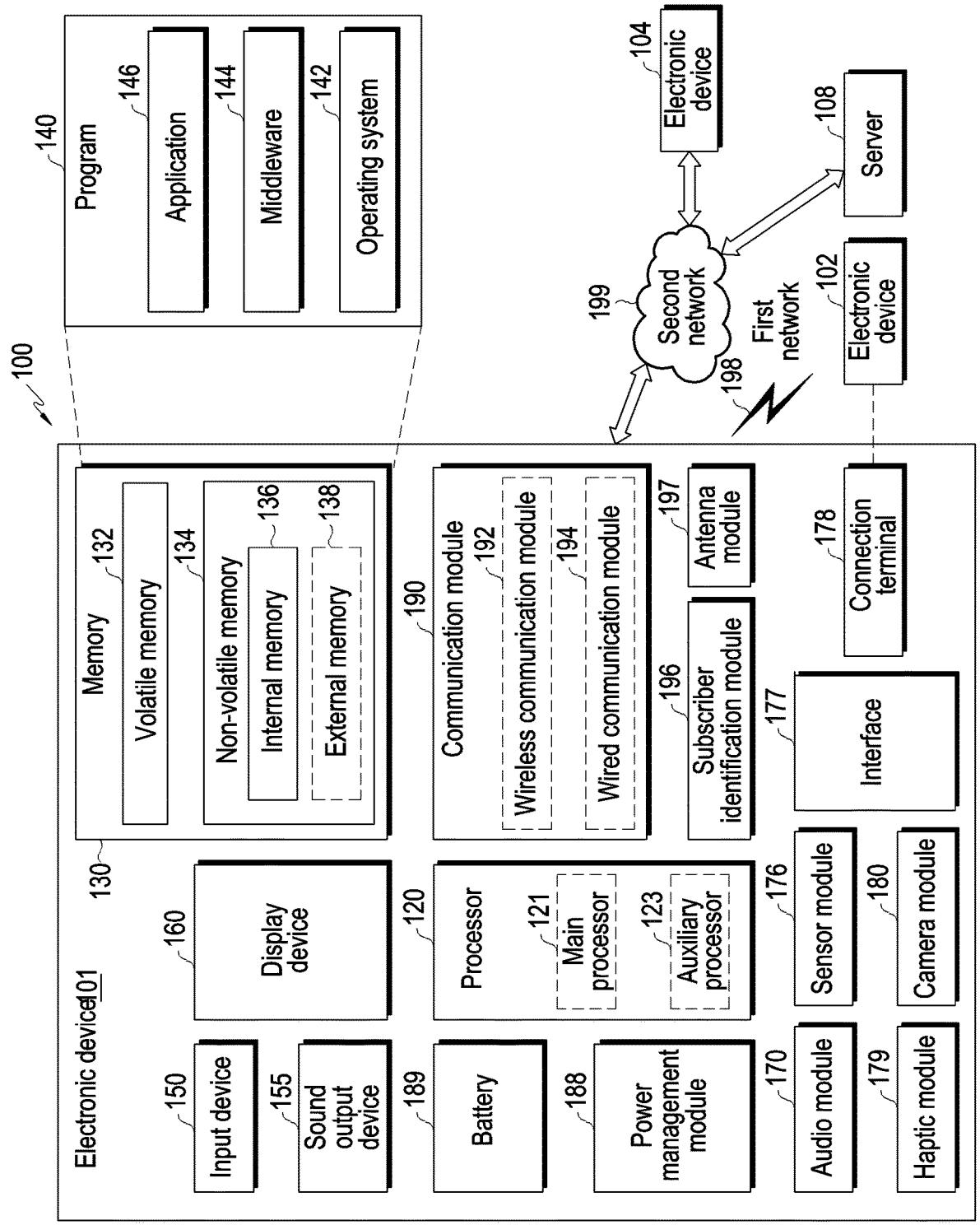
FIG. 1 is a block diagram of an electronic device in a network environment according to various embodiments.

FIG. 1 is a block diagram illustrating an electronic device in a network environment according to various embodiments.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an external electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, a description will be made of an electronic device and a communication device capable of being inserted into the electronic device according to various embodiments. A description of the electronic device 101 provided in the network environment 100 illustrated in FIG. 1 can be applied to an electronic device and a communication device in FIG. 2, and thus a redundant description will be omitted.

Figure 2:
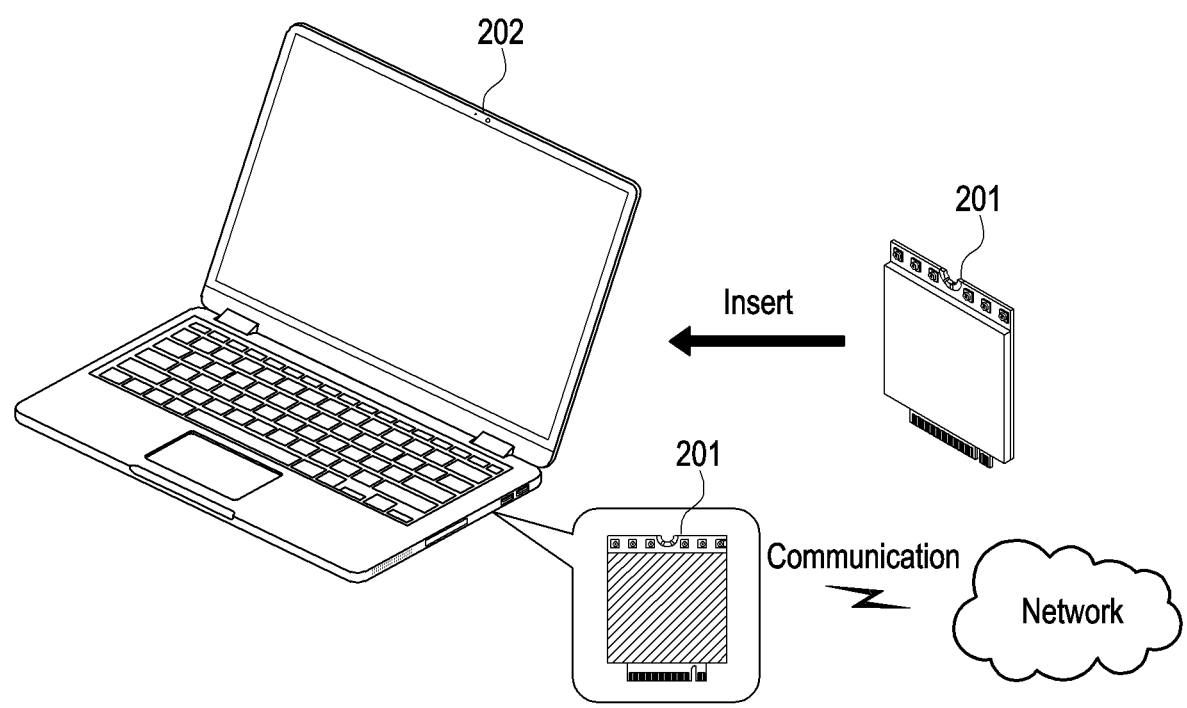
FIG. 2 is a view illustrating an example of an electronic device and a communication device capable of being inserted into the electronic device according to various embodiments.

FIG. 2 is a view illustrating an example of an electronic device and a communication device capable of being inserted into the electronic device according to various embodiments.

Referring to FIG. 2, an electronic device 202 and a communication device 201 capable of being inserted into an electronic device 202 may be provided. Hereinafter, each of the electronic device 202 and the communication device 201 will be described.

First, the electronic device 202 will be described.

According to various embodiments, the electronic device 202 may include a physical structure into which an insertable device (e.g., the communication device 201) can be inserted. For example, the electronic device 202 may include a region in which a physical structure, such as a slot or a socket, into which the communication device 201 can be inserted, is formed. The physical structure may be configured to correspond to the specification (e.g., M.2) of the communication device 201 which is inserted into the electronic device 202. The communication device 201 inserted into the electronic device 202 may be electrically and/or operatively connected to the electronic device 202. In another example, the electronic device 202 may include a physical structure or a connection device (e.g., a connector) which can be electrically and/or operatively connected to the communication device 201. The electrical connection may imply that the electronic device 202 and the communication device 201 are connected to each other such that power, a signal (e.g., a control signal of a processor of the electronic device 202), information, or data is transmitted and/or received therebetween. Further, the operative connection may imply that the electronic device 202 and the communication device 201 are connected each other such that an operation (e.g., communication connection) of the electronic device 202 is performed based on the communication device 201 (e.g., the communication device 201 controls an antenna), or an operation of (e.g., antenna control) of the communication device 201 is performed based on the electronic device 202 (e.g., the electronic device 202 provides power). Insertion of the communication device 201 into the electronic device 202, and electrical connection and/or operative connection between the electronic device 202 and the communication device 201 by the insertion will be described later in FIGS. 5, 6, and 7A to 7D.

According to various embodiments, the electronic device 202 may include various types of computers. For example, the electronic device 202 may include a notebook computer including a standard notebook, an Ultrabook, a netbook, and a tabbook, a laptop computer, a tablet computer, and a desktop computer. Further, without being limited the description, the electronic device 202 may be various types of devices, each of which has a physical structure, such as a slot or a socket, into which the communication device 201 can be inserted, or a device (e.g., a connector) connected to the communication device 201. For example, the electronic device 202 may be a portable terminal including a slot into which the communication device 201 can be inserted.

Hereinafter, the communication device 201 will be described.

According to various embodiments, the communication device 201 may support various types of communication. For example, the communication device 201 may perform a control operation for various types of communication. In one example, the communication device 201 may perform control operations for cellular communication (or mobile communication), such as $3^{rd}$ generation (3G), $4^{th}$ generation long term evolution (4G LTE), long term evolution advanced (LTE-Adv), or $5^{th}$ generation (5G), short-range wireless communication, such as near field communication (NFC), radio-frequency identification (RFID), Bluetooth, Bluetooth low energy (BLE), or wireless fidelity (Wi-Fi) Direct, wireless communication using an access point (AP), such as Wi-Fi, and wired communication, such as USB or Ethernet. When the communication device 201 is inserted into the electronic device 202 and electrically or operatively connected to the electronic device 202, the communication device 201 may perform an operation of transmitting and/or receiving data and/or information to/from the outside (e.g., network) based on a communication method supported by the communication device 201. Based on the operation of the communication device 201, the electronic device 202 may transmit and/or receive a communication signal, data, and/or information through various types communication supported by the communication device 201. Without being limited the description, contents described below may also be applied to devices (e.g., a memory card and a graphic card), which can be inserted into the electronic device 202 and supports various functions, in addition to the communication device 201 supporting a communication function.

According to various embodiments, the communication device 201 may be a device implemented with a specific interface specification (or a specific physical specification). For example, the communication device 201 may be a device of M.2 specification. Further, without being limited to the description, the communication device 201 may be the communication device 201 having various specifications, which can be inserted into the electronic device 202.

Further, without being limited to the description, contents described below may be applied to various types of devices (e.g., a memory card and a graphic card), which can be inserted into the electronic device 202, in addition to the communication device 201. For example, electrically connectable or separable ground pads (e.g., the upper-surface ground pads and the lower-surface ground pads) described below may be implemented on substrates of various types of insertable devices, and control circuits may be provided thereon.

Hereinafter, the electronic device 202 and the communication device according to various embodiments will be further described. Hereinafter, one example of the physical configuration and/or physical structure of the electronic device 202 and the communication device 201, which have been described will be further described with reference to FIGS. 3, 4A, and 4B.

Figure 3:
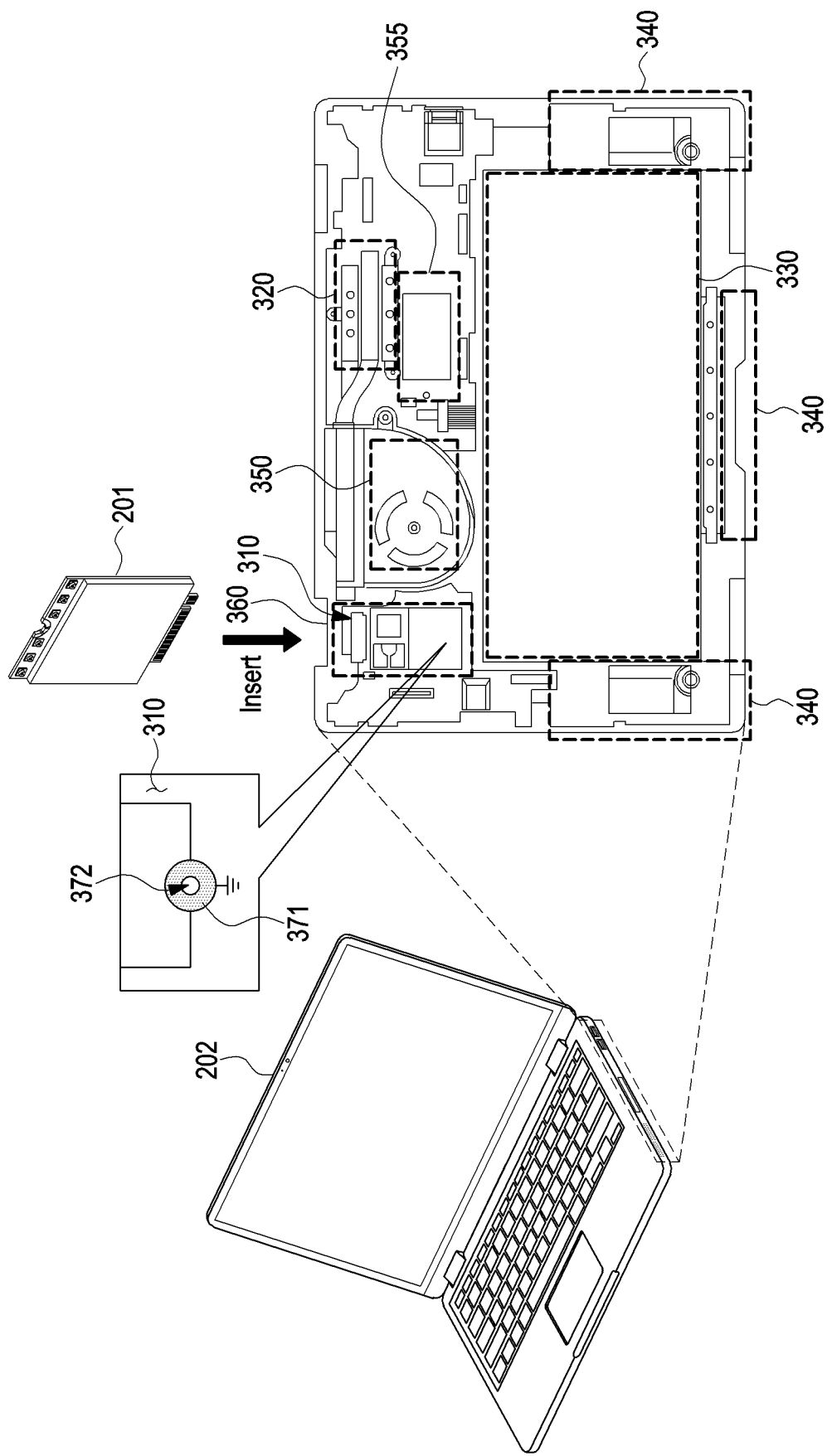
FIG. 3 is a view illustrating one example of a physical configuration and/or physical structure of an electronic device according to various embodiments.
Figure 4A:
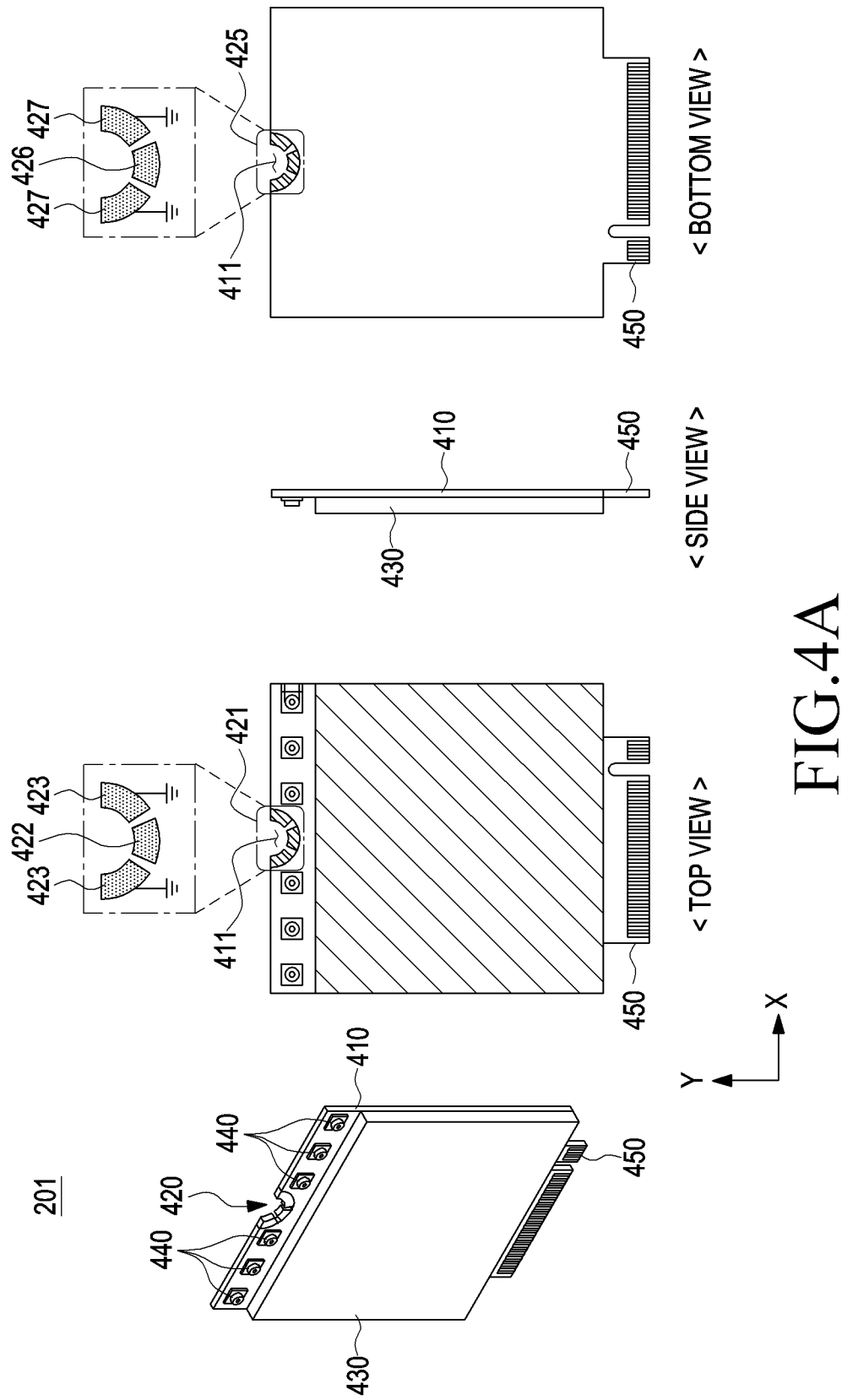
FIG. 4A is a view illustrating one example of a physical configuration and/or physical structure of a communication device according to various embodiments.
Figure 4B:
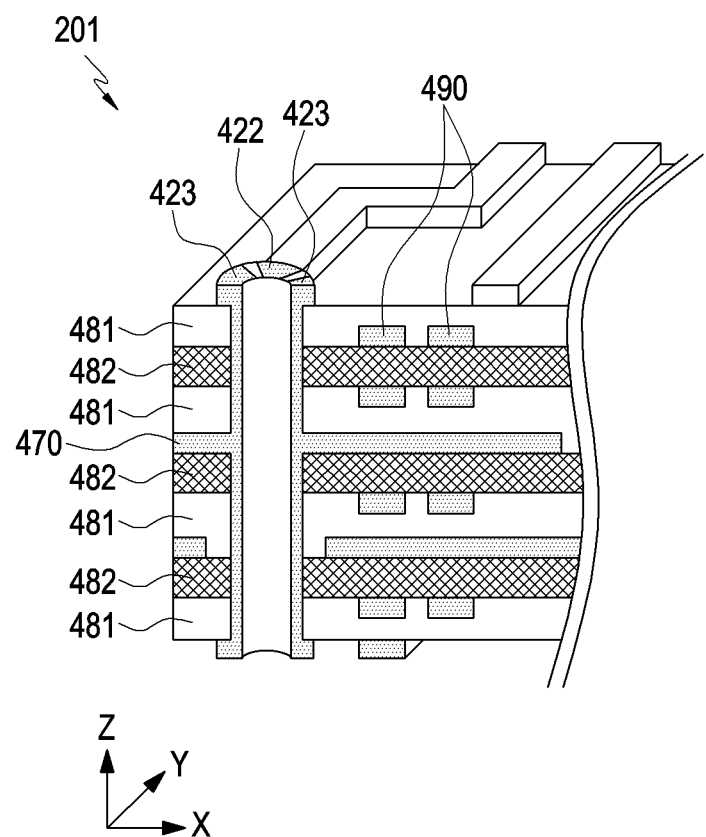
FIG. 4B is a side view of a portion of a substrate on which a ground pad of a communication device is disposed according to various embodiments.

FIG. 3 is a view illustrating one example of a physical configuration and/or physical structure of an electronic device according to various embodiments. FIG. 4A is a view illustrating one example of a physical configuration and/or physical structure of a communication device according to according to various embodiments. FIG. 4B is a side view of a portion of a substrate on which a ground pad of a communication device is disposed according to various embodiments.

First, a description will be made of one example of the physical configuration and/or physical structure of the electronic device 202.

Referring to FIG. 3, an electronic device 202 may include a first substrate 310, a processor 320, a battery 330, multiple antennas 340, a fan 350, a memory 355, and a slot (or a socket or a connector) 360 into which a communication device 201 can be inserted. Without being limited to the illustration, the electronic device 202 may be also configured to include more elements than the elements illustrated in FIG. 3 or to include fewer elements than the elements illustrated in FIG. 3. For example, the elements of the electronic device 202 illustrated in FIG. 1 may be further implemented on the substrate of FIG. 3.

According to various embodiments, elements of the electronic device 202 may be disposed on the first substrate 310. For example, the processor 320, the battery 330, the multiple antennas 340, the fan 350, the memory 355, and the slot (or a socket, or a connector) 360 into which the communication device 201 can be inserted may be disposed (or implemented) on the first substrate 310. Although not illustrated in FIG. 3, the processor 320, the battery 330, in addition to the multiple antennas 340, the fan 350, the memory 355, and the slot (or a socket, or a connector) 360 into which the communication device 201 can be inserted, a circuit and an input/output port may be installed integrating and connecting various types of cables or wires may be installed. The substrate may include a mainboard, a motherboard (or mobo), a main circuit board, a base board, a planar board, or system board. In addition, the substrate may be implemented as in a well-known technology, and thus a detailed description thereof will be omitted.

According to various embodiments, the processor 320 may generally control an operation of the electronic device 202. When the communication device 201 is inserted and electrically connected to, the processor 320 may output a control signal for controlling an element (e.g., a converter circuit) of the communication device 201. The processor 320 may be an application processor (AP) including various types of processors, such as a computer processing unit (CPU) and a graphic processing unit (GPU). In addition, the processor 320 may be implemented as in a well-known technology, and thus a detailed description thereof will be omitted.

According to various embodiments, the battery 330 may store power, and may provide the stored power for operations of elements (e.g., the processor 320) of the electronic device 202 and/or the communication device 201. The power of the battery 330 may be converted by a first converter circuit (in FIG. 6) described later into power having a level required by the elements of the electronic device 202 and/or the communication device 201 and then provided. In addition, the battery 330 may be implemented as in a well-known technology, and thus a detailed description thereof will be omitted.

According to various embodiments, the multiple antennas 340 may transmit a communication signal to the outside (e.g., a network), or may receive a communication signal therefrom. For example, under control the inserted communication device 201, the multiple antennas 340 may transmit and/or receive a communication signal based on a communication scheme (e.g., 5G) supported by the communication device 201. In addition, the multiple antennas 340 may be implemented as in a well-known technology, and thus a detailed description thereof will be omitted.

According to various embodiments, the fan 350 may rotate to discharge heat that is generated by an operation of the electronic device 202. Without being limited to the description, in addition the fan 350, a cooler for discharging waste heat of the electronic device 202 may be provided in the electronic device 202. In addition, the fan 350 may be implemented as in a well-known technology, and thus a detailed description thereof will be omitted.

According to various embodiments, the memory 355 may temporarily or semi-permanently store information associated with the electronic device 202. The memory 355 may include a read-only memory (ROM) for storing an operation program (an operating system (OS)) for driving, or a random access memory (RAM) for storing data for hosting websites or data regarding programs or applications (for example, a web application). In addition, the memory 355 may be implemented as in a well-known technology, and thus a detailed description thereof will be omitted.

According to various embodiments, the slot (or a socket, or a connector) 360 into which the communication device 201 can be inserted may be formed, on the substrate, as a physical structure which has a physical specification corresponding to the physical specification (e.g., M.2) of the communication device 201. For example, as described later, a structure 501, in which a connector 503 for electrical connection to the communication device 201 is formed, may be implemented in the slot 360. In another example, as illustrated in FIG. 3, a fastening structure to which the communication device 201 can be fastened may be formed in the slot into which the same can be inserted. The fastening structure may include a hole 372 having a screw line formed on the inner surface thereof such that a fastening member (e.g., a screw) described later can be inserted into and fastened to the hole. A ground pad 371 formed of a conductive material is disposed in an adjacent region (e.g., a region around the entrance of the hole) of the substrate in which the fastening structure (e.g., the hole) is formed. The ground pad 371 may be electrically connected to a ground (e.g., 641 in FIG. 6 described later) of the electronic device 202. The ground functions as a common ground of devices (e.g., the communication device 201 or the electronic device 202), and may become a reference point for signal lines connected to the ground. Further, electric charge (or power) may be released from the signal lines connected through the ground. When the communication device 201 is fastened to the electronic device 202, a lower-surface ground pad disposed on the lower surface of the substrate of the communication device 201 is brought into contact with the ground pad 371 of the slot, and is electrically connected so that a ground of the communication device 201 can be ensured (or electrical stability can be ensured). A description thereof will be described later.

Hereinafter, a description will be made of one example of the physical configuration and/or physical structure of the communication device 201.

Referring to FIG. 4A, the communication device 201 may include a second substrate 410 having a fastening structure formed thereon, a ground pad 420, at least one circuit 430, an antenna connector 440, and a contactor 450. Further, referring to FIG. 4B, the communication device 201 may include, in the second substrate 410, a ground 470, an insulating layer (e.g., a PCB core 481 or PREPEG 482), and metal lines 490 connected to elements (e.g., at least one circuit) of the communication device 201.

According to various embodiments, the elements (e.g., the ground pad 420, the at least one circuit 430, the antenna connector 440, and the contactor 450) of the communication device 201 may be disposed (implemented) on the second substrate 410. As described above, the second substrate 410 may be implemented in a form factor of an M.2 specification. Although not illustrated in FIG. 4A, in addition to the elements (e.g., the ground pad 420, the at least one circuit 430, the antenna connector 440, the contactor 450) of the communication device 201, a circuit and an input/output port for integrating and connecting various types of cables or wires may be installed.

Referring to FIG. 4B, metal lines 490 connected to the elements of the communication device 201 may be included in the second substrate 410. The metal lines 490 may be electrically connected to the ground 470 through a via hole. In addition, the second substrate 410 may be implemented as in a well-known technology, and thus a detailed description thereof will be omitted.

According to various embodiments, a fastening structure to be fastened to the electronic device 202 may be formed on the second substrate 410. For example, as illustrated in FIG. 4A, the fastening structure of the communication device 201 may include a recessed region 411 recessed inward from the side surface of the second substrate 410 of the communication device 201. When the second substrate 410 of the communication device 201 is placed on the substrate of the electronic device 202 by insertion of the communication device 201 into the slot 360 of the electronic device 202, the fastening structure (e.g., the hole 372) of the slot 360 of the electronic device 202 may be exposed through the recessed region 411. A description will be made, later in FIG. 5, of an example in which the second substrate 410 of the communication device 201 and the first substrate 310 of the electronic device 202 are fastened to each other by insertion of a fastening member (e.g., a screw) 510 through the recessed region 411 of the fastening structure.

According to various embodiments, as illustrated in FIG. 4A, ground pads (e.g., 421 and 425) may be disposed in the upper surface region of the second substrate 410 and the lower surface region of the second substrate 410 in which the fastening structure is formed. For example, the ground pads may include multiple conductors (e.g., 422, 423, 426, and 427). The conductors (e.g., 422, 423, 426, and 427) may be disposed on the upper surface of the second substrate 410 and the lower surface of the second substrate 410 along the recessed region 411 of the fastening structure, which has a predetermined curvature and is recessed inward from the side surface of the second substrate 410. Conductors (e.g., 422 and 423), which are disposed in the upper surface region of the second substrate 410, among the conductors (e.g., 422, 423, 426, and 427) may be defined as upper-surface ground pads 421, and conductors (e.g., 426 and 427) disposed on the lower surface of the second substrate 410 may be defined as lower-surface ground pads 425. As illustrated in FIG. 4B, the conductors (e.g., 422, 423, 426, and 427) disposed on the upper surface and the lower surface may include floating conductors 422 and 426 and at least one ground conductor 423 and 427, which are electrically disconnected from each other. The floating conductors 422 and 426 may be disposed to be spaced apart from the at least one ground conductor 423 and 427, and thus may be electrically disconnected therefrom. The floating conductors 422 and 426 may be connected to a power line and a control circuit (or a logic circuit) described later, and the at least one ground conductors 423 and 427 may be connected to the ground 470 formed in the second substrate 410, as illustrated in FIG. 4B. Unlike the at least one ground conductors 423 and 427, the floating conductors 422 and 426 may not be electrically connected to the ground 470, like a conductor 422 in FIG. 4B. The floating conductor 422 and at least ground conductor 423, disposed on the upper surface, may be electrically connected to each other by the fastening member (e.g., the screw) 510 inserted through the fastening structure as described later, and a floating conductor 426 and at least on ground conductor 427 may be electrically connected to each other by contact between the electronic device 202 and the ground pad 371 of the first substrate 310 as described later. A description thereof will be described later in FIGS. 8,9, 10A, and 10B.

According to various embodiments, the ground pads (e.g., 421 and 425) disposed on the upper surface or the lower surface of the second substrate 410 are not limited those illustrated in FIG. 4A, and may be implemented in various forms. For example, the ground pads may be implemented in various forms such that the conductors are electrically disconnected from each other, wherein some conductors are connected to the ground 470 and the other conductors are not connected to the ground 470.

According to various embodiments, the at least one circuit 430 may include elements, such as a second process 650 and memories 671 and 672 described later. The at least one circuit provided in the communication device 201 may be implemented as in a well-known technology, and thus a detailed description thereof will be omitted.

According to various embodiments, the antenna connector 440 may be electrically and/or operatively connected to each of multiple antennas of the electronic device 202. The antenna connector 440 provided in the communication device 201 may be implemented as in a well-known technology, and thus a detailed description thereof will be omitted.

According to various embodiments, the contactor 450 may include an element (e.g., multiple pins) to be electrically connected to the connector 503 of the slot 360 of the electronic device 202. As described later, in the state in which the communication device 201 is inserted into the slot 360 of the electronic device 202, the contactor 450 may be brought into contact with and/or connected to the connector 503 of the slot 360, and thus an electrical element (e.g., a power line or a signal line) of the communication device 201 may be connected to an electrical element (e.g., a power line or a signal ling) of the electronic device 202 so that power, signals, data, and/or information may be exchanged between the elements (e.g., the processor (e.g., 610 in FIG. 6 described later) of the electronic device 202 and a second converter circuit (e.g., 680 in FIG. 6 described later) of the communication device 201. The contactor 450 provided in the communication device 201 may be implemented as in a well-known technology, and thus a detailed description thereof will be omitted.

Without being limited to the description, contents described below may be applied to various types of devices (e.g., a memory card and a graphic card), which can be inserted into the electronic device 202, in addition to the communication device 201.

Hereinafter, a description will be made of one example of fastening between the communication device 201 and the electronic device 202 according to various embodiments.

Figure 5:
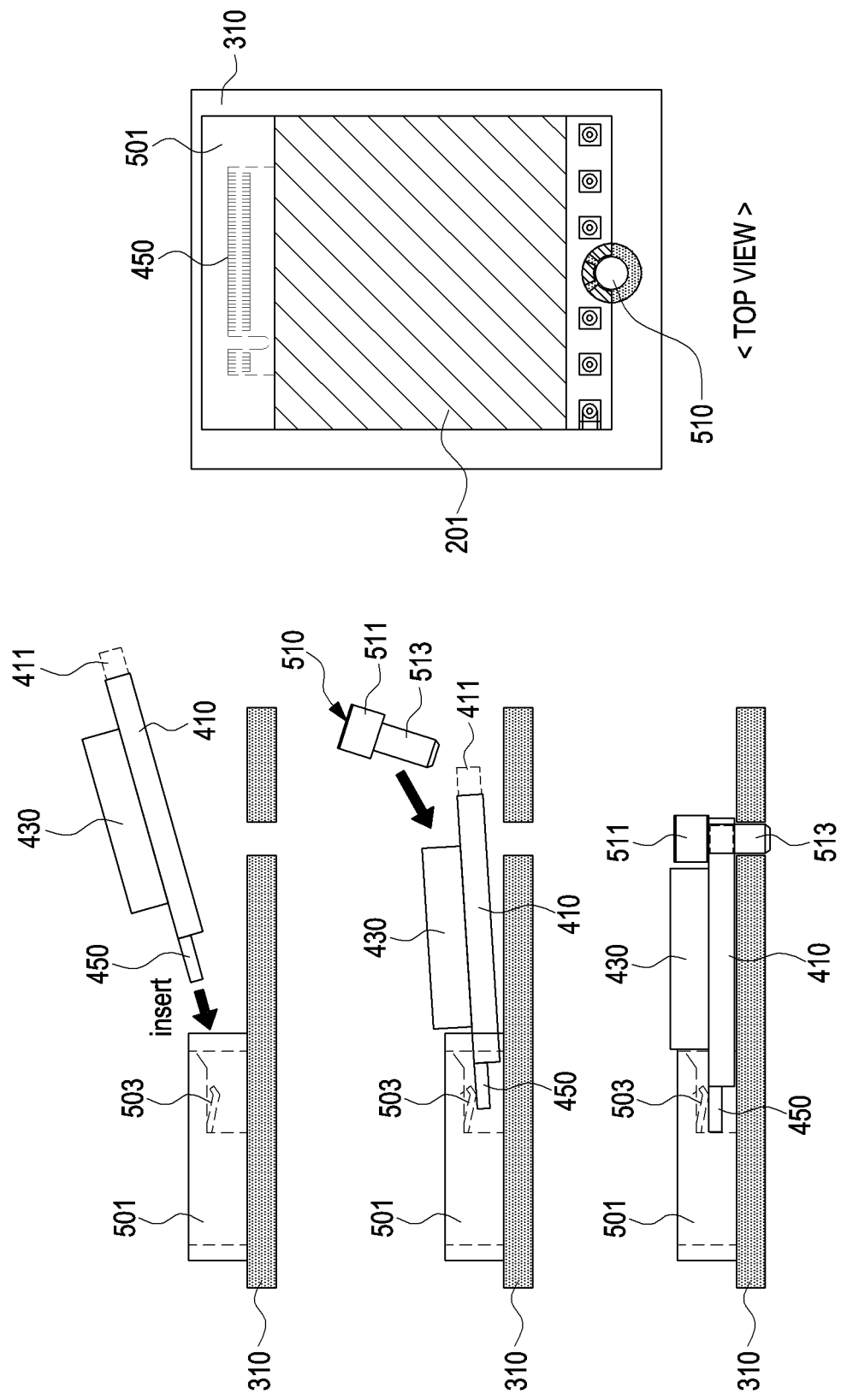
FIG. 5 is a view illustrating an example of fastening between a communication device and an electronic device according to various embodiments.

FIG. 5 is a view illustrating an example of fastening between a communication device and an electronic device according to various embodiments.

Referring to FIG. 5, the slot 360 of the electronic device 202 may include, as illustrated in FIG. 5, a structure 501 including a connector 503 which is to be electrically connected to the contactor 450 of the communication device 201. The connector 503 may include multiple pins for electrical connection, and may be electrically connected to the communication device 201 by being brought into contact and/or connected to the multiple pins included in the contactor 450 of the communication device 201.

According to various embodiments, in a state in which a portion (e.g., the contactor 450) of the communication device 201 is inserted into the slot 360 (e.g., the structure 501 of the slot 360) of the electronic device 202, the first substrate 310 of the electronic device 202 may be fastened to the second substrate 410 of the communication device 201. In a state in which the second substrate 410 of the communication device 201 is inserted into the structure 501 of the slot 360, a fastening member 510 (e.g., a screw), or members for fastening without being limited to the description) is fastened, as illustrated in FIG. 5, to the fastening structure of the first substrate 310 of the electronic device 202 through the recessed region 411 of the fastening structure of the second substrate 410 of the communication device 201, and thus the second substrate 410 of the communication device 201 may be connected the first substrate 310 of the electronic device 202. The fastening member 510 may include a head 511 and a body 513 having a screw line formed on the outer circumferential surface thereof. Each of the head 511 and the body 513 may be formed of a material having conductivity, and thus may have conductivity. When the fastening member 510 is inserted into the fastening structure (e.g., a hole (372 in FIG. 3)) of the electronic device 202, the screw line formed on the outer circumferential surface of the body of the fastening member 510 may be engaged with a screw line in the fastening structure (e.g., a hole (372 in FIG. 3)) of the first substrate 310 of the electronic device 202. Due to the engagement, force is applied from the upper surface of the second substrate 410 of the communication device 201 toward the upper surface of the first substrate 310 of the electronic device 202 by the head 511 of the fastening member 510, and the second substrate 410 of the communication device 201 may be tightly fastened to the first substrate 310 of the electronic device 202.

According to various embodiments, when the second substrate 410 of the communication device 201 is completely fastened to the first substrate 310 of the electronic device 202 by the fastening member 510, electrically disconnected conductors disposed on at least one of the upper surface or the lower surface of the second substrate 410 of the communication device 201 may be electrically connected to each other. For example, the upper-surface ground pads 421 of the second substrate 410 of the communication device 201, described above, may be brought into contact with a portion of the head 511 (e.g., the bottom surface of the head 511) of the fastening member 510, and the upper-surface ground pads 421 may be electrically connected to each other through the head 511 of the fastening member 510. In another example, the lower-surface ground pads 425 of the second substrate 410 of the communication device 201 may be brought into contact with the ground pad 371 formed at the fastening structure of the upper surface of the first substrate 310 of the electronic device 202, and the lower-surface ground pads 425 may be electrically connected to each other through the ground pad 371 of the first substrate 310 of the electronic device 202. Thus, a ground (e.g., 641 in FIG. 6 described later) of the electronic device 202 may be electrically connected to the ground 470 of the communication device 201 through the ground pad 371 of the first substrate 310 and the lower-surface ground pads 425 of the second substrate 410, and thus a ground of the communication device 201 may be ensured. For example, the ground of the electronic device 101 may be used as a ground while an operation of the communication device 201 is performed. A control circuit 690, described later, may detect at least one of whether the upper-surface ground pads 421 are electrically connected to each other or whether the lower-surface ground pads 425 are electrically connected to each other, and a description thereof will be made later in FIGS. 7A to 7D, 8, 9, 10A, and 10B.

Hereinafter, a description will be made of examples of circuit configurations of the electronic device 202 and the communication device 201 electrically and/or operatively connected by the above-described insertion and fastening.

Figure 6:
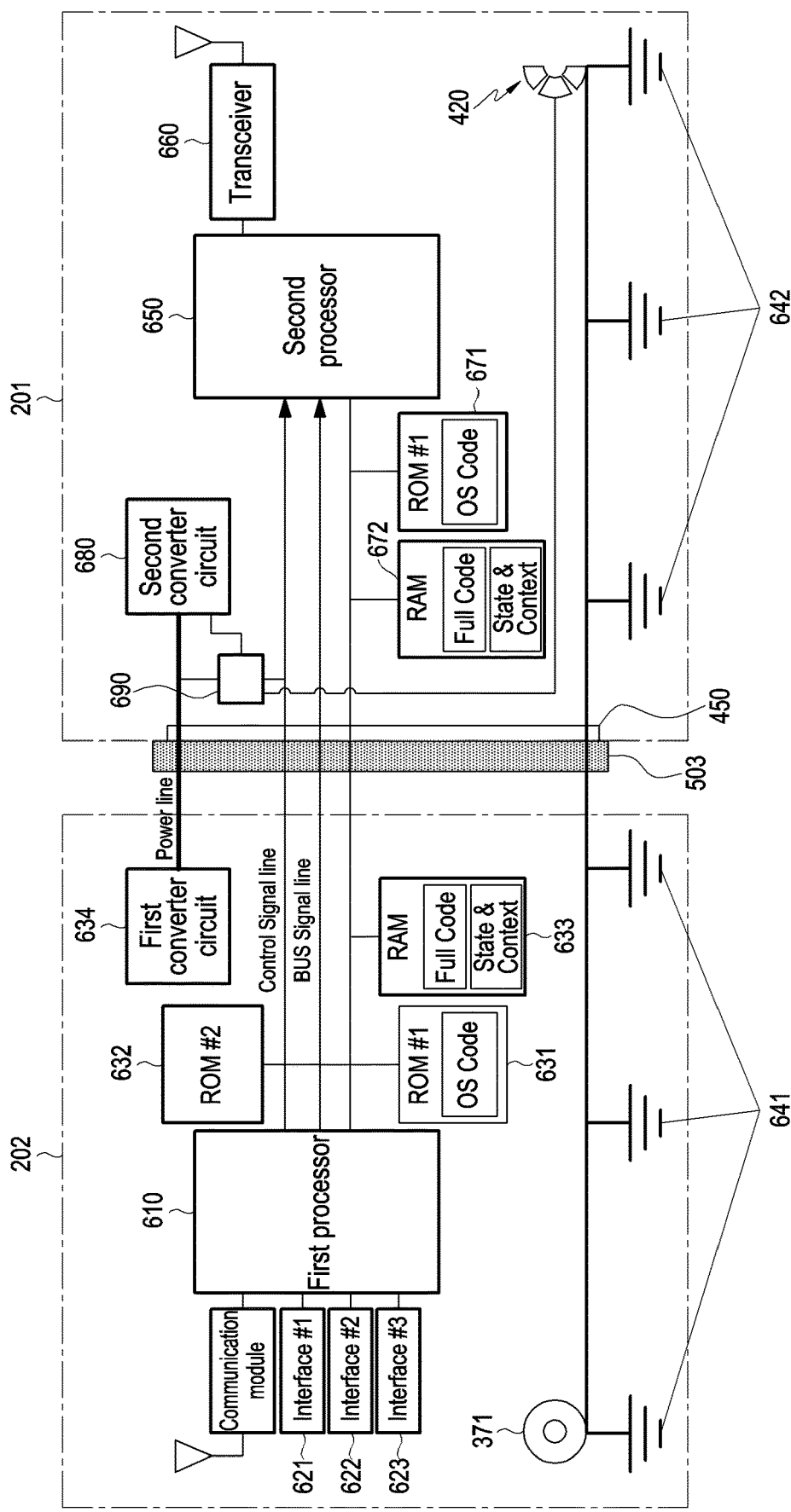
FIG. 6 is a view illustrating an example of a circuit configuration of a communication device and a circuit configuration of an electronic device according to an embodiment of the disclosure.

FIG. 6 is a view illustrating an example of a circuit configuration of a communication device and a circuit configuration of an electronic device according to various embodiments. Hereinafter, the control circuits in FIG. 6 will be described with reference to FIGS. 7A to 7D.

Figure 7A:
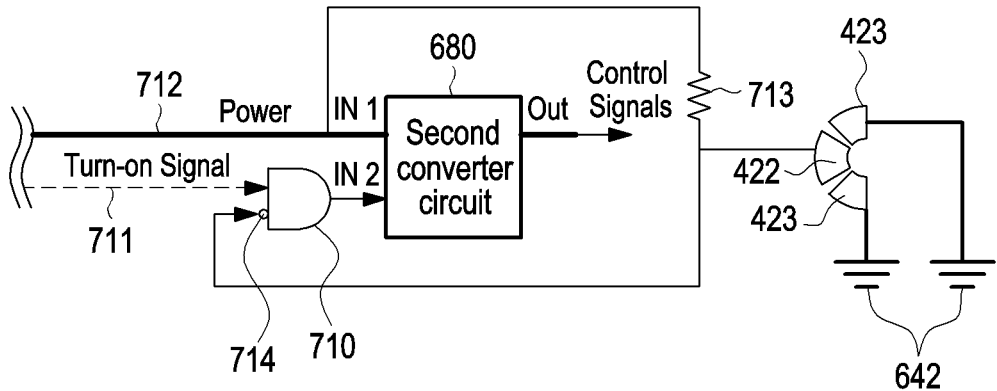
FIG. 7A is a view illustrating one example of a control circuit included in a communication device according to various embodiments.
Figure 7B:
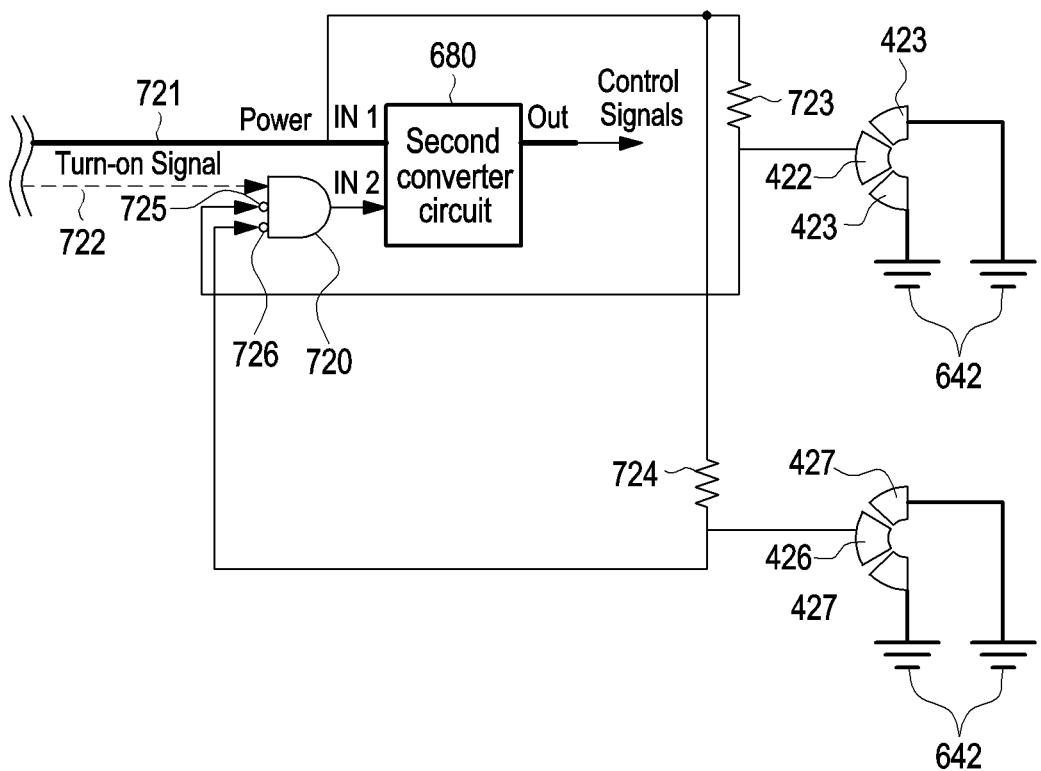
FIG. 7B is a view illustrating another example of a control circuit included in a communication device according to various embodiments.
Figure 7C:
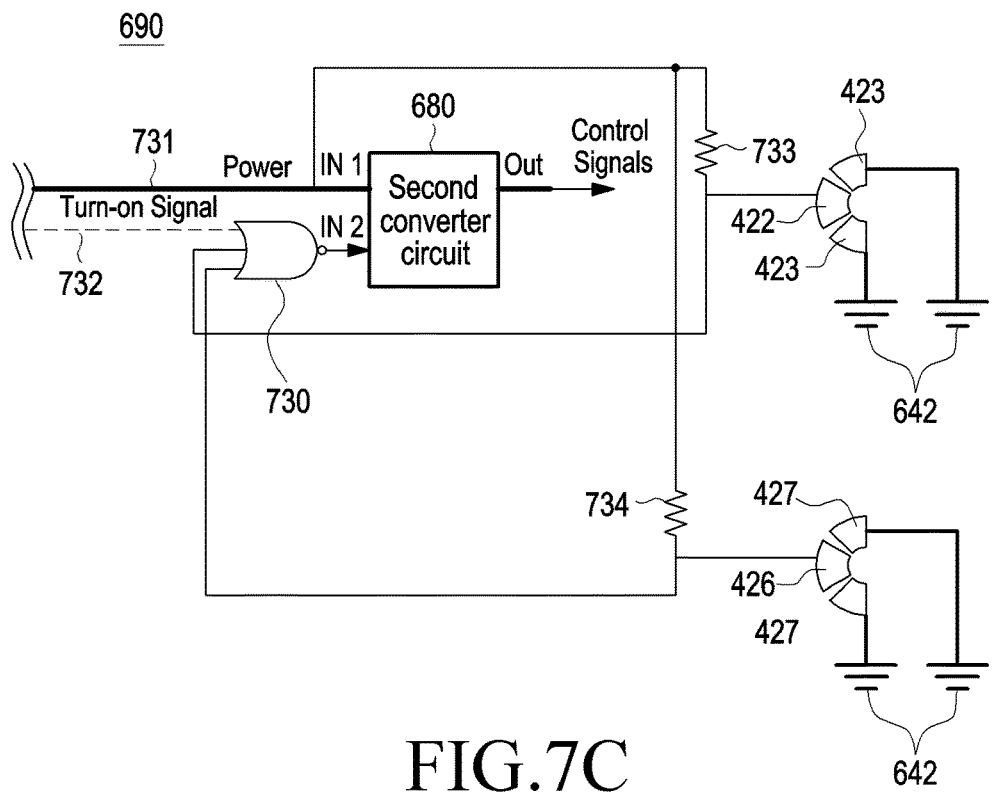
FIG. 7C is a view illustrating another example of a control circuit included in a communication device according to various embodiments.
Figure 7D:
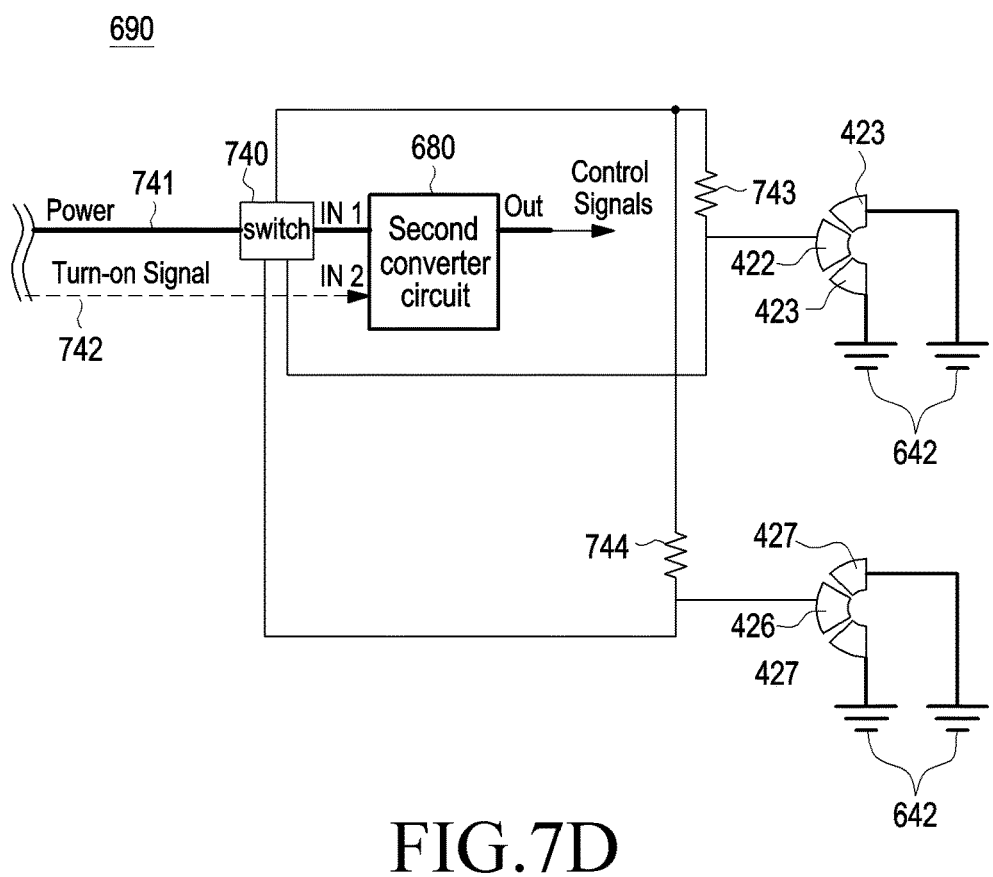
FIG. 7D is a view illustrating another example of a control circuit included in a communication device according to various embodiments.

FIG. 7A is a view illustrating one example of a control circuit included in a communication device according to various embodiments. FIG. 7B is a view illustrating another example of a control circuit included in a communication device according to various embodiments. FIG. 7C is a view illustrating another example of a control circuit included in a communication device according to various embodiments. FIG. 7D is a view illustrating another example of a control circuit included in a communication device according to various embodiments.

Hereinafter, a description will be made of an example of electrical connection and/or operative connection between electronic device 202 and communication device 201 by the insertion and/or fastening of the communication device 201.

According to various embodiments, by insertion of the communication device 201 into the electronic device 202 (e.g., the contactor 450 of the communication device 201 is brought into contact with a connector 503 of the electronic device 202) and fastening between the electronic device 202 and the electronic device 202, as illustrated in FIG. 6, the electronic device 202 may be electrically connected to some circuit elements of the communication device 201.

For example, lines (or lanes) (e.g., (a power lane, a power rail, or a power line), a bus line, a control signal line) for exchanging power, signals, information and/or data between the electronic device 202 and the communication device 201 may be connected to each other. In one example, a first converter circuit 634 of the electronic device 202 may be connected to a second converter circuit 680 of the communication device 201 through power lines. A first power line connected to an output terminal of the first converter circuit 634 may be electrically connected to a second power line connected to an input terminal of the second converter circuit 680. In another example, a signal line for transmitting and/or receiving a control signal may be connected to a bus line for transmitting and/or receiving data. A signal line connected to a first processor 610 of the electronic device 202 may be electrically connected to a signal line connected to a second processor 650 of the communication device 201. Further, the signal line of the first processor 610 of the electronic device 202 may be electrically connected to signal lines of other elements (e.g., the second converter circuit 680) of the communication device 201.

In another example, the ground 641 of the electronic device 202 may be connected to a ground 642 of the communication device 201 (e.g., the ground 470 formed in the second substrate 410 in FIG. 4B). As described above, the ground pad 371 of the fastening structure of the first substrate 310 of the electronic device 202 is connected to the lower-surface ground pads 425 of the second substrate 410 of the communication device 201, and thus the ground 641 of the electronic device 202 and the ground 642 of the communication device 201 may be electrically connected to each other as illustrated in FIG. 6. The grounds (e.g., 641) of the electronic device 202 is electrically connected to the grounds 642 of the communication device 201, and thus grounds for the elements of the communication device 201 may be ensured.

Hereinafter, a description will be made of an example of the circuit configuration of the electronic device 202 and an example of the circuit configuration of the communication device 201.

First, an example of the circuit configuration of the electronic device 202 will be described.

According to various embodiments, referring to FIG. 6, the electronic device 202 may include a first processor 610, a communication module 620, interface circuits 621, 622, and 623 for connection to multiple devices (e.g., a speaker, a display, and an input device, such as a mouse and a keyboard), multiple memories 631, 632, and 633, a first converter circuit 634, and a ground 641.

According to various embodiments, the first processor 610 of the electronic device 202 may transmit a control signal to elements (e.g., the second converter circuit 680) of the communication device 201 electrically connected thereto. The first processor 610 is not limited to that illustrated in FIG. 6, and may transmit a control signal to other elements (e.g., the second processor 650 of the communication device 201) in addition to the second converter circuit 680 of the communication device 201. Thus, the operation in which the first processor 610 transmits a control signal to the second converter circuit 680 of the communication device 201 may also be applied to an operation in which the first processor 610 transmits a control signal to other elements of the communication device 201 (e.g., the second processor 650 of the communication device 201). The first processor 610 may be implemented like the processor 320 in FIG. 3, and thus a redundant description will be omitted.

According to various embodiments, the communication module 620 may establish a direct (e.g., wired) communication channel or a wireless communication channel between the electronic device 202 and the external electronic device 202, and may support communication using the established communication channel. The communication module 620 may support a communication scheme that is different from a communication scheme supported by the communication device 201. For example, when the communication device 201 supports 5G communication, a communication module of the electronic device 202 may support network communication, such as a personal area network (PAN) or WAN. The communication module 620 may be implemented like the communication module 190 in FIG. 1, and thus a redundant description thereof will be omitted.

According to various embodiments, each of the interface circuits 621, 622, and 623 may include a connection element, such as a connector, to be connected to a speaker, a display, and input devices, such as a mouse and a keyboard.

According to various embodiments, the multiple memories 631, 632, and 633 may include read-only memory (ROM) (ROM #1, 631) for storing an operating program (operating system (OS)) for driving the electronic device 202, ROM (ROM #2,632) including an additional information region, and random access memory (RAM) 633 for storing data for hosting websites or data regarding programs or applications (for example, a web application), a full code, and/or state/context information. In addition, the memories 631, 632, and 633 may be implemented as in a well-known technology, and thus a detailed description thereof will be omitted.

According to various embodiments, the first converter circuit 634 may be a converter circuit for converting DC power (e.g., increasing a voltage or reducing a voltage) and transmitting the same to other elements of the electronic device 202. For example, the first converter circuit 634 may convert power acquired from a battery (e.g., 330 in FIG. 3)

and transmit the same to the other elements (e.g., the first processor 610) of the electronic device 202. In another example, the first converter circuit 634 may convert power and transmit the same to elements (e.g., the second converter circuit 680) of the communication device 201 which is electrically connected thereto. Without being limited to the description, the first converter circuit 634 may also transmit the converted power to other elements (e.g., the second processor 650 of the communication device 201) in addition to the second converter circuit 680 of the communication device 201. The first converter circuit 634 may be a DC/DC converter circuit which includes a voltage-reducing converter, a buck converter, a step-down converter, a voltage-increasing converter, a boost converter, a step-up converter, a voltage-increasing/reducing converter, a buck-boost converter, a negative voltage converter, a switching converter, or an inverting converter. Alternatively, without being limited to the description, the first converter circuit 634 may be a DC/AC converter circuit or an AC/DC converter circuit.

According to various embodiments, the ground 641 may be electrically connected to some of the circuit elements of the electronic device 202 to become a common ground when electrical operations of the circuit elements are performed. Referring to FIG. 6, as described above, the ground may be electrically connected to the ground pad 371 of the slot 360 disposed on the first substrate 310.

Hereinafter, an example of the circuit configuration of the communication device 201 will be described.

According to various embodiments, referring to FIG. 6, the communication device 201 may include the second processor 650, a transceiver 660, multiple memories 671 and 672, the second converter circuit 680, a control circuit 690, and the ground 642 (e.g., 740 in FIG. 4B).

According to various embodiments, the second processor 650 of the communication device 201 may control overall operations of the communication device 201. The second processor 650 of the communication device 201 may be implemented like the above-described first processor 610 of the electronic device 202, and thus a redundant description thereof will be omitted. The second processor 650 of the communication device 201 may be a modem processor.

According to various embodiments, the transceiver 660 may transmit and/or receive a communication signal based on a communication scheme supported by the communication device 201. The transceiver 660 may include multiple antennas. A description of the multiple antennas is as described above, and thus a redundant description thereof will be omitted.

According to various embodiments, the multiple memories 671 and 672 may include read-only memory (ROM) (ROM #1, 671) for storing an operating program (operating system (OS)) for driving the communication device 201, and random access Memory (RAM) 672 for storing data for hosting websites or data regarding programs or applications (for example, a web application), a full code, and/or state/context information. In addition, the memories 671 and 672 may be implemented as in a well-known technology, and thus a detailed description thereof will be omitted.

According to various embodiments, the second converter circuit 680 may convert DC power (e.g., may increase or reduce a voltage) and transmit the same to other elements of the communication device 201. For example, an input terminal of the second converter circuit 680 may be electrically connected to the first converter circuit 634 of the electronic device 202, and may convert power transferred from the first converter circuit 634 and transfer the same to other elements (e.g., the second processor 650) of the communication device 201. Like the first converter circuit 634, the second converter circuit 680 may be a DC/DC converter circuit. Alternatively, without being limited to the description, the second converter circuit 680 may also be a DC/AC converter circuit or an AC/DC converter circuit.

According to various embodiments, the control circuit 690 may be configured to output a control signal for controlling some elements (e.g., the second converter circuit 680) of the communication device 201. For example, the control signal may be a signal which induces the second converter circuit 680 to perform an operation of converting power provided from the electronic device 202 (e.g., power transferred from the first converter circuit 634) and transferring the power to the elements of the communication device 201. As illustrated in FIG. 6, the control circuit 690 may be electrically connected to some of a power line (e.g., a power line input into the second converter circuit 680), a signal line (e.g., a control signal line input into the second processor 650), some of ground pads (e.g., the above-described upper-surface ground pads 421 or lower-surface ground pads 425 in FIGS. 4A and 4B) (e.g., the floated ground pads (e.g., 422 and 426)), and some elements (e.g., the second converter circuit 680) of the communication device 201. It is illustrated that the control circuit 690 is connected to only the second converter circuit 680. However, the control circuit 690 is not limited thereto, and may be connected to various elements of the communication device 201 to transmit, to the various elements, control signals for controlling the various elements.

According to various embodiments, the control circuit 690 may output a control signal for controlling the second converter circuit 680 based on a signal (e.g., a high-level signal or a low-level signal) generated by at least one among a power line, a signal line, or some of the ground pads. A signal received by the control circuit 690 may include a high-level signal and a low-level signal. The high-level signal may be defined as a signal having a high value (e.g., +5V, Vcc), and the low-level signal may be defined as a signal having a low value (e.g., 0V, gnd). The high value and the low value are not limited to the description, can be configured as various values, and can also be adjusted. For example, the control circuit 690 may receive the high-level signal or the low-level signal generated based on whether there is electrical connection between the ground pads (e.g., the above-described upper-surface ground pads 421 or lower-surface ground pads 425 in FIGS. 4A and 4B), and may output, based on the received signal, a control signal for controlling a converter circuit. In one example, the control circuit 690 may receive a signal (e.g., a signal having a high value) when the upper-surface ground pads 421 (or the lower-surface ground pads 425) are electrically connected to each other, and may output a control signal, based on the received signal. In another example, the control circuit 690 may receive a signal (e.g., a signal having a low value) generated when the upper-surface pads 421 (or the lower-surface ground pads 425) are not electrically connected to each other, and may output the control signal, based on the received signal. A specific example of the control circuit 690 and examples of an operation thereof will be described below.

Hereinafter, specific examples of the control circuit 690 and examples of operation thereof will be described with reference to FIGS. 7A to 7D. Without being limited to the elements illustrated in FIGS. 7A to 7D, the control circuit 690 may be implemented so as to include more elements (e.g., electrical elements, such as an inductor, a capacitor, and a resistor) or fewer elements than the elements illustrated in FIGS. 7A to 7D. It is illustrated that an output terminal of the control circuit 690 (e.g., a logic circuit or a switch) is connected to the second converter circuit 680, but the output terminal of the control circuit 690 is not limited thereto, and may be connected to various elements of the communication device 201.

According to various embodiments, as illustrated in FIG. 7A, the control circuit 690 may include an AND logic circuit 710 including two input terminals (e.g., a first input terminal and a second input terminal) and an output terminal, an inverter 714, and a resistor (e.g., a pull-up resistor) 713. The first input terminal of the AND logic circuit 710 may be connected to a signal line. The second input terminal of the AND logic circuit 710 may be connected to an output terminal of the inverter 714, and an input terminal of the inverter may be connected to a floated ground pad (e.g., a first conductor 422) among ground pads (e.g., the upper-surface ground pads 421 or the lower-surface ground pads 425 illustrated in FIGS. 4A and 4B), and may be connected to a power line 712 through the resistor 713. The first input terminal of the AND logic circuit 710 may receive, through the signal line 711, a first signal (e.g., a signal for turning on a converter) which is a high-level signal output from the first processor 610 of the electronic device 202. The second input terminal of the AND logic circuit 710 may receive a second signal, which is a high-level signal, or a third signal, which is a low-level signal, from the output terminal of the inverter 714 based on whether the floated ground pad (e.g., the first conductor 422) is electrically connected to the remaining ground pads (e.g., at least one second conductor 423). The operation of receiving signals having different levels (e.g., a high level or a low level) based on whether the ground pad is electrically connected will be described later in relation to FIGS. 8, 9, 10A, and 10B. When high-level signals are received through both the first input terminal and the second input terminal, the AND logic circuit 710 may output, through the output terminal thereof, a control signal for controlling the second converter circuit 680.

According to various embodiments, as illustrated in FIG. 7B, the control circuit 690 may include an AND logic circuit 720 including three input terminals (e.g., a first input terminal, a second input terminal, and a third input terminal) and an output terminal, inverters (e.g., a first inverter 725 and a second inverter 726), and resistors (e.g., a first resistor 723 and a second resistor 724). The first input terminal of the AND logic circuit 720 may be connected to a signal line 722. The first input terminal of the AND logic circuit 720 may receive, through the signal line, a first signal (e.g., a signal for turning on the second converter circuit 680), which is a high-level signal output from the first processor 610 of the electronic device 202. The second input terminal of the AND logic circuit 720 may be connected to an output terminal of the first inverter 725, and an input terminal of the first inverter may be connected to a floated ground pad (e.g., the first conductor 422) among upper-surface ground pads, and may be connected to a power line 721 through the first resistor 723. The second input terminal of the AND logic circuit 720 may receive a second signal, which is a high-level signal, or a third signal, which is a low-level signal, from an output terminal of the first inverter 725 based on the floated ground pad (e.g., the first conductor 422) is electrically connected to the remaining ground pads (e.g., the at least one second conductor 423). The third input terminal of the AND logic circuit 720 may be connected to an output terminal of the second inverter 726, and an input terminal of the second inverter 726 may be connected to a floated ground pad (e.g., a third conductor 426) among lower-surface ground pads, and may be connected to the power line 721 through the second resistor 724. The third input terminal of the AND logic circuit 720 may receive a second signal, which is a high-level signal, or a third signal, which is a low-level signal from the output terminal of the second inverter 726 based on whether the floated ground pad (e.g., the third conductor 426) is electrically connected to the remaining ground pads (e.g., at least one fourth conductor 427). The operation of receiving signals having different levels (e.g., a high level or a low level) based on whether the ground pad is electrically connected will be described later in relation to FIGS. 8, 9, 10A, and 10B. When high-level signals are received through all of the first input terminal, the second input terminal, and the third input terminal, the AND logic circuit 720 may output, through the output terminal thereof, a control signal for controlling the second converter circuit 680.

According to various embodiments, as illustrated in FIG. 7C, the control circuit 690 may include an NOR logic circuit 730 including three input terminals (e.g., a first input terminal, a second input terminal, and a third input terminal) and an output terminal, and resistors (e.g., a first resistor 733 and a second resistor 734). The first input terminal of the NOR logic circuit 730 may be connected to a signal line 732. The first input terminal of the NOR logic circuit 730 may receive, through the signal line 732, a first signal (e.g., a signal for turning on the second converter circuit 680), which is a high-level signal output from the first processor 610 of the electronic device 202. The second input terminal of the NOR logic circuit 730 may be connected to a floated ground pad (e.g., the first conductor 422) among upper-surface ground pads, and may be connected to a power line 731 through the first resistor 733. The second input terminal of the NOR logic circuit 730 may receive a second signal, which is a high-level signal, or a third signal, which is a low-level signal, based on whether the floated ground pad (e.g., the first conductor 422) is electrically connected to the remaining ground pads (e.g., the at least one second conductor 423). The third input terminal of the NOR logic circuit 730 may be connected to a floated ground pad (e.g., the third conductor 426) among lower-surface ground pads, and may be connected to the power line 731 through the second resistor 734. The third input terminal of the NOR logic circuit 730 may receive a second signal, which is a high-level signal, or a third signal, which is a low-level signal, based on whether the floated ground pad (e.g., the third conductor 426) is electrically connected to the remaining ground pads (e.g., the at least one fourth conductor 427). The operation of receiving signals having different levels (e.g., a high level or a low level) based on whether the ground pad is electrically connected will be described later in relation to FIGS. 8, 9, 10A, and 10B. When a low-level signal is received through the first input terminal, and when high-level signals are received through all of at least one of the second input terminal or the third input terminal, the NOR logic circuit 730 may output, through the output terminal thereof, a control signal for controlling the second converter circuit 680.

According to various embodiments, as illustrated in FIG. 7D, the control circuit 690 may include a switch circuit 740 and resistors (e.g., a first resistor 743 and a second resistor 744). An input terminal of the switch circuit 740 may be connected to an output terminal of the first converter circuit 634 of the electronic device 202, and an output terminal of the switch circuit is connected to an input terminal of the second converter circuit 680 of the communication device 201. Therefore, whether power is transferred from the first converter circuit 634 to the second converter circuit 680 may be determined based on the opened/closed state of the switch circuit 740. For example, the opened/closed state of the switch circuit may be changed depending on whether the upper-surface ground pads 422 and 423 are electrically connected to each other and whether the lower-surface ground pads 426 and 427 are electrically connected to each other. For example, a first signal input terminal of the switch circuit 740 may be connected to a floated ground pad (e.g., the first conductor 422) among the upper-surface ground pads, and may be connected to a power line 741 through the first resistor 743. The first signal input terminal of the switch circuit 740 may receive a high-level signal or a low-level signal based on whether the floated ground pad (e.g., the first conductor 422) is electrically connected to the remaining ground pads (e.g., at least one second conductor 423). A second signal input terminal of the switch circuit 740 may be connected to a floated ground pad (e.g., the third conductor 426) among the lower-surface grounds, and may be connected to the power line 741 through the second resistor 744. The first signal input terminal of the switch circuit 740 may receive a high-level signal or a low-level signal based on whether the floated ground pad (e.g., the third conductor 426) is electrically connected to the remaining ground pads (e.g., the at least one fourth conductor 427). The switch circuit 740 may be implemented such that, when a high-level signal is received from two signal input terminals (e.g., the first signal input terminal and the second signal input terminal), the switch circuit 740 is closed, and thus poser is transferred from the first converter circuit 634 to the second converter circuit 680. Further, the switch circuit 740 may be implemented such that the switch circuit 740 is closed when a high-level signal is received from at least one of two signal input terminals. Further, the switch circuit 740 may be implemented such that the switch circuit 740 is opened when low-level signals are received from all of two signal input terminals. The second converter circuit 680 may be turned on by receiving a control signal from the first processor 610 through a signal line 742, and may convert and output power received while the switch circuit 740 is closed.

Hereinafter, examples of an operation of the communication device 201 according to various embodiments will be described.

According to various embodiments, the communication device 201 (e.g., the control circuit 690) may perform an operation of blocking a signal and/or power, received from the electronic device 202, based on whether the communication device 201 is fastened normally by the fastening member and/or whether the communication device 201 is brought into contact with the ground pad 371 of the first substrate 310 of the electronic device 202.

Figure 8:
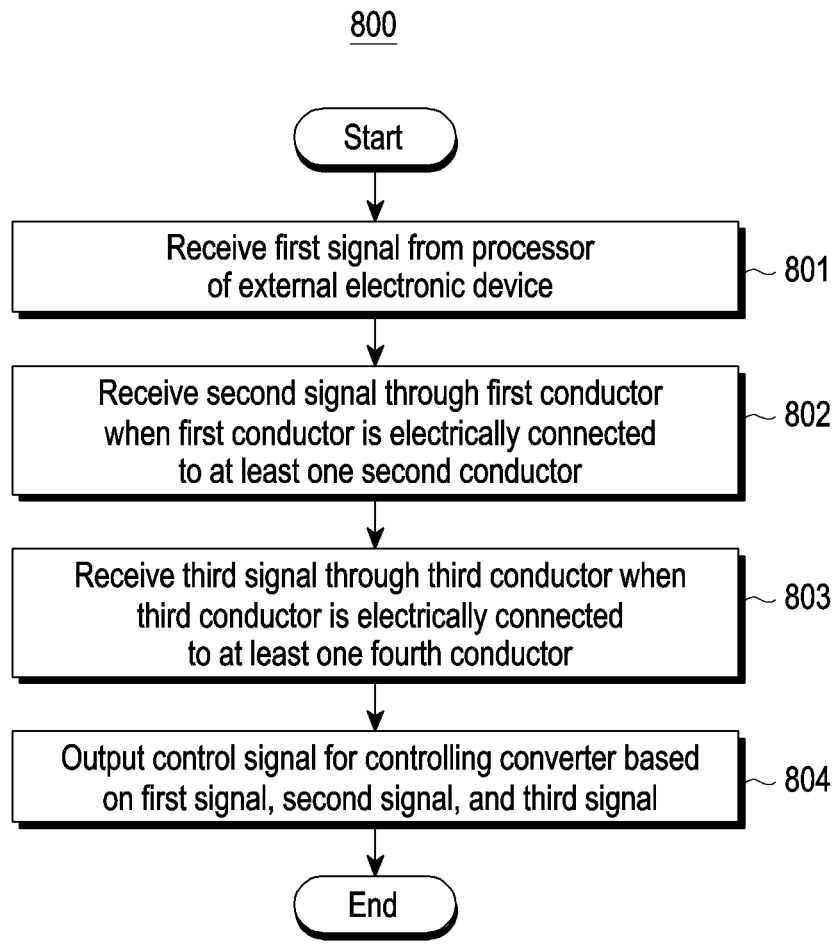
FIG. 8 is a flowchart illustrating one example of an operation of a communication device according to various embodiments.

FIG. 8 is a flowchart 800 illustrating one example of an operation of a communication device according to various embodiments. According to various embodiments, operations illustrated in FIG. 8 may be performed in various orders without being limited to the illustrated order. Further, according to various embodiments, more operations than the operations illustrated in FIG. 8 may be performed, or at least one operation which is fewer than the operations illustrated in FIG. 8 may be performed. Hereinafter, FIG. 8 will be described with reference to FIGS. 9, 10A, and 10B.

Figure 9:
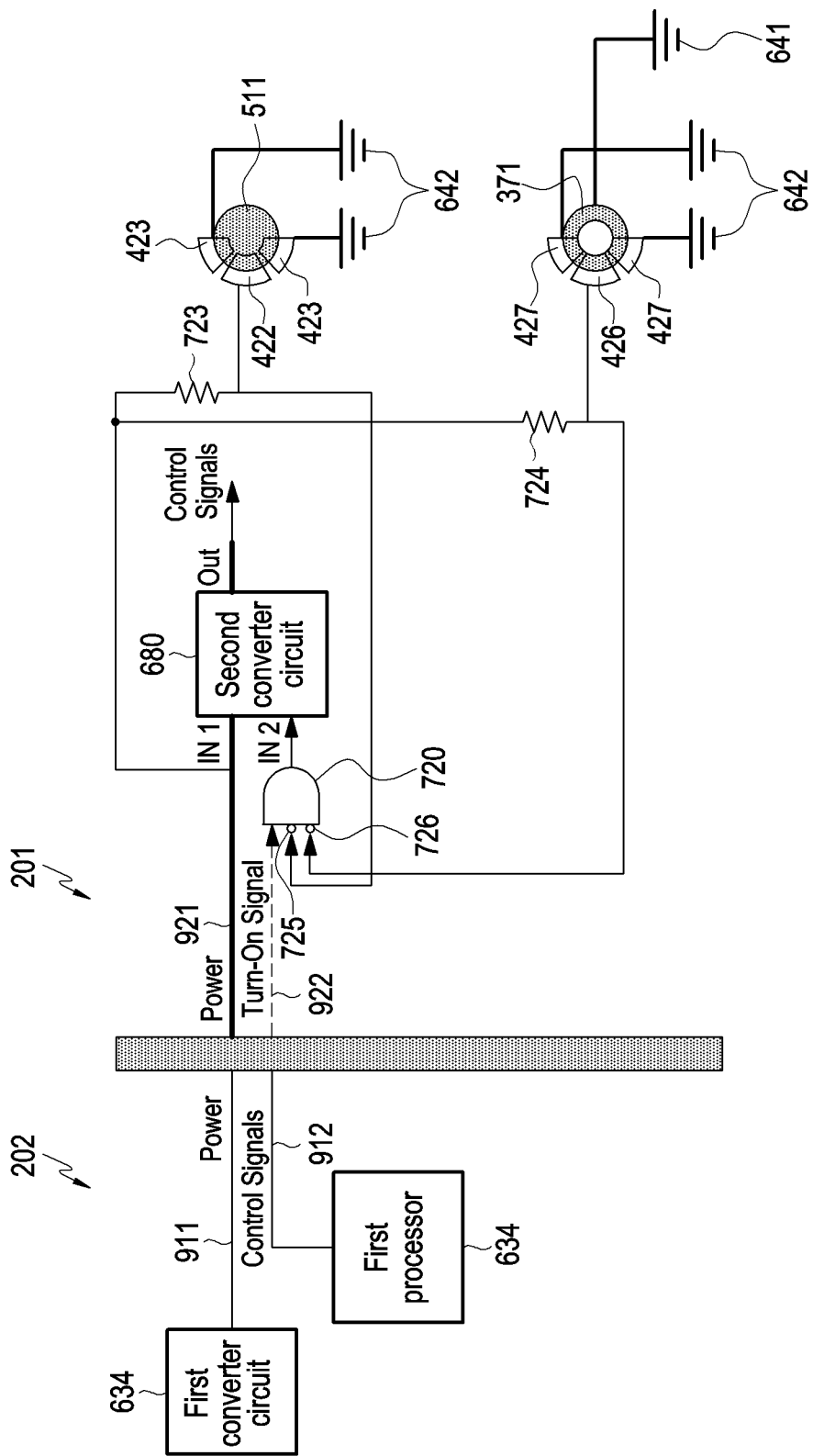
FIG. 9 is a view illustrating one example of an operation of blocking a signal and/or power, which is received from an electronic device, based on whether a communication device according to various embodiments is normally fastened by a fastening member of the communication device and/or whether the communication device is brought into contact with a ground pad of a first substrate of the electronic device.
Figure 10A:
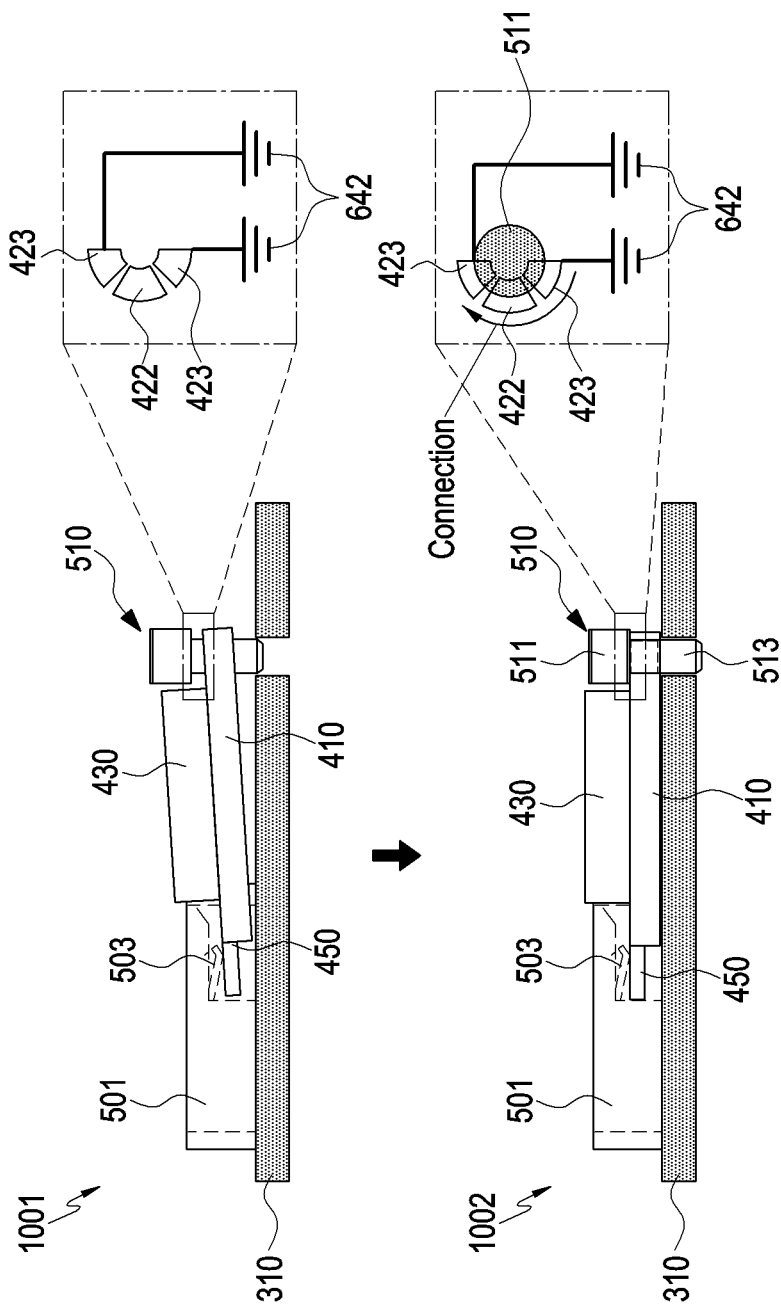
FIG. 10A is a view illustrating an example of electrical connection between upper-surface ground pads of a communication device according to various embodiments by a fastening member.
Figure 10B:
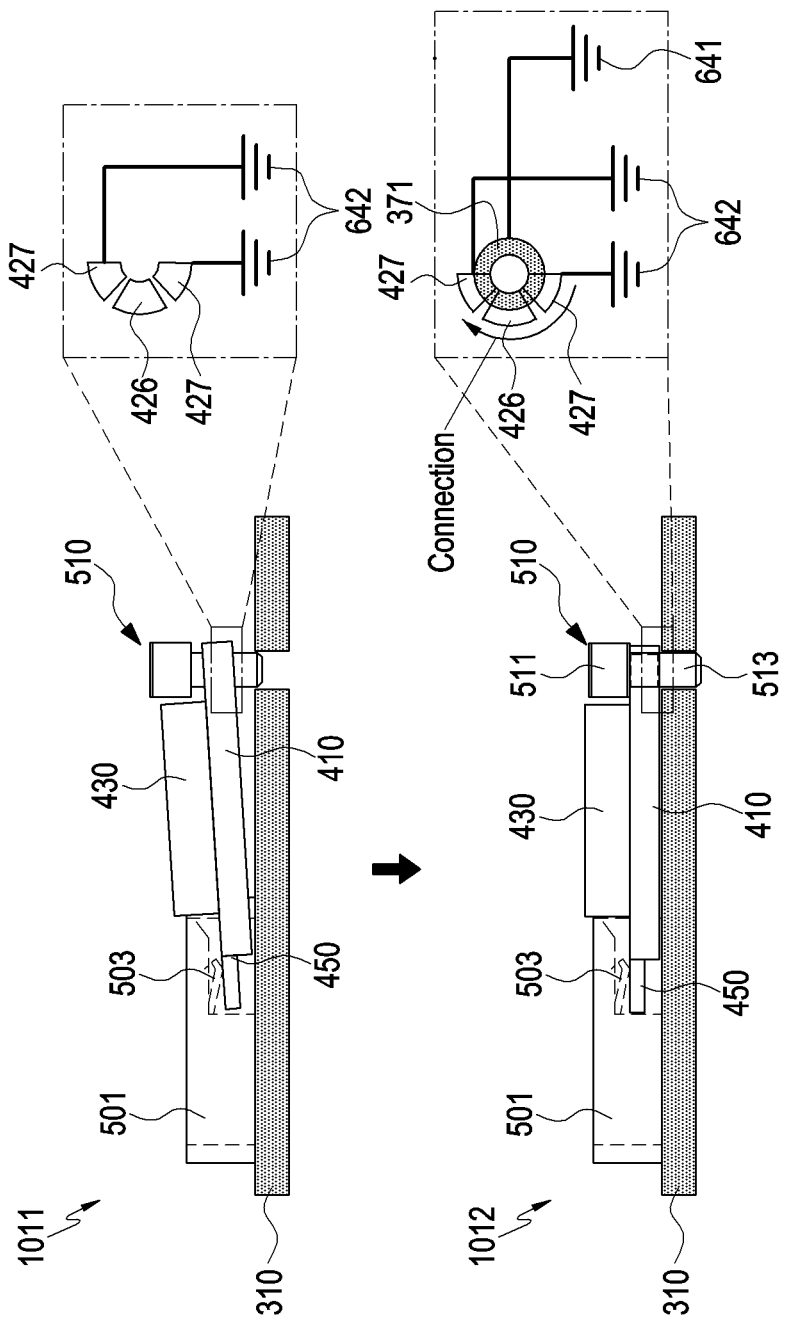
FIG. 10B is a view illustrating an example of electrical connection between lower-surface ground pads of a communication device according to various embodiments by a ground pad of a first substrate of an electronic device.

FIG. 9 is a view illustrating one example of an operation of blocking a signal and/or power, which is received from an electronic device, on the basis of whether a communication device according to various embodiments is normally fastened by a fastening member of the communication device and/or whether the communication device is brought into contact with a ground pad of a first substrate of the electronic device. FIG. 10A is a view illustrating an example of electrical connection between upper-surface ground pads of a communication device according to various embodiments by a fastening member. FIG. 10B is a view illustrating an example of electrical connection between lower-surface ground pads of a communication device according to various embodiments by a ground pad of a first substrate of an electronic device.

According to various embodiments, in operation 801, the communication device 201 (e.g., a control circuit (e.g., 690 in FIG. 6)) may receive a first signal from a processor of an external electronic device 202. For example, as illustrated in FIG. 9, the control circuit (e.g., 690 in FIG. 6) (e.g., the AND logic circuit) may receive, through the first input terminal, a high-level signal (e.g., the first signal (e.g., a signal for turning on the second converter circuit 680)) or a low-level signal from the first processor 610 of the electronic device 202 via electrically connected signal lines 912 and 922. As described in FIG. 5, when the communication device 201 is completely inserted into the slot 360 of the electronic device 202 (e.g., a contact part of the communication device 201 is brought into contact with a connector of the electronic device 202), a second signal line 922 connected to the first input terminal of the control circuit (e.g., 690 in FIG. 6) of the communication device 201 may be connected to a first signal line 912 of the electronic device 202. When the first processor 610 of the electronic device 202 outputs a first signal (e.g., a signal for turning on the second converter circuit 680), the control circuit (e.g., 690 in FIG. 6) may receive, through the first input terminal, the first signal which is a high-level signal, and may receive a low-level signal (or may not receive a signal) when the first processor 610 does not output the first signal.

According to various embodiments, the first processor 610 of the electronic device 202 may output the first signal (e.g., the signal for turning on the second converter circuit 680), based on satisfaction of a designated event. For example, the satisfaction of the designated event may include an event in which the electronic device 202 is turned on, or an event in which a program for controlling the electronic device 202 to output the first signal is executed and/or driven. Without being limited to the description, the first processor 610 of electronic device 202 may be configured to output the first signal in response to receiving a signal fed back from the communication device 201 (e.g., a signal indicting whether the communication device 201 is fastened and/or whether the communication device 201 is brought into contact with a ground pad of the first substrate of the electronic device 202). A description thereof will be described later in FIGS. 12 and 13.

According to various embodiments, in operation 802, when a first conductor is electrically connected to at least one second conductor, the communication device 201 may receive a second signal through the first conductor. For example, as illustrated in FIG. 9, the control circuit (e.g., 690 in FIG. 6) (e.g., the AND logic circuit 720) may receive a high-level signal (e.g., the second signal) or a low-level signal through the second input terminal based on whether upper-surface ground pads (e.g., the first conductor 422 and the at least one second conductor 423) disposed on the upper surface of the second substrate 410 of the communication device 201 are electrically connected to each other. The second input terminal of the AND logic circuit 720 may be connected, through the first inverter 725, to a ground pad (e.g., the first conductor 422), which is floated (or is not connected to the ground), among the upper ground pads, and may be connected to a power line (e.g., a second power line 921 connected to the input terminal of the second converter circuit 680) through the first resistor 723. The state of electrical connection between the upper-surface ground pads 422 and 423 may be changed depending on the communication device 201 is fastened to the electronic device 202 by a fastening member (e.g., a screw) (e.g., 510), and a high-level signal or a low-level signal may be generated based on the change of the connection state. The second input terminal of the AND logic circuit 720 may receive the high-level signal or the low-level signal that has been generated based on the change of the connection state. Hereinafter, a description will be additionally made of a change in the state of electrical connection between the upper-surface ground pads 422 and 423 and an example of an operation of receiving a high-level signal or a low-level signal by the AND logic circuit 720 based on the change in the state of electrical connection.

According to various embodiments, when the upper-surface ground pads are electrically disconnected from each other, the AND logic circuit 720 may receive a low-level signal (e.g., a signal having a designated low value). For example, as illustrated in 1001 of FIG. 10A, upper-surface ground pads (e.g., the first conductor 422 and the at least one second conductor 423 electrically disconnected the first conductor 422) disposed to be spaced apart from each other on the upper surface of the second substrate 410 of the communication device 201 may be electrically disconnected from each other. When the first converter circuit 634 outputs power, power flowing along the second power line 921 due to the electrical connection drops to a high-level signal (e.g., a signal having a designated high value (e.g., Vcc, +5V)) through the first resistor 723 (e.g., a voltage and/or a current is dropped by a resistor), and the high-level signal may be transferred to an input terminal of the first inverter 725 through the first conductor 422 connected to the first resistor 723. The first inverter 725 may invert the high-level signal into a low-level signal, and may output the low-level signal through an output terminal. The AND logic circuit 720 may receive, through the second input terminal, the low-level signal output from the first inverter 725.

According to various embodiments, when the upper-surface ground pads 422 and 423 are electrically connected to each other, the AND logic circuit 720 may receive a high-level signal (e.g., a signal having a designated high value). For example, as illustrated in 1002 of FIG. 10A, in a state in which the second substrate 410 of the communication device 201 is completely inserted into the slot 360 of the electronic device 202, the fastening member 510 may be inserted into, the fastening structure of the electronic device 202 through a recessed region (e.g., 411) of the fastening structure of the second substrate 410 of the communication device 201. When the fastening member 510 is completely fastened, the head 511 of the fastening member 510 may be brought into contact with all of the upper-surface ground pads (e.g., the first conductor 422 and the at least one second conductor 423 electrically disconnected from the first conductor 422), which are electrically disconnected from each other. The upper-surface ground pads may be electrically connected to each other through the head 511 of the contacted fastening member 510. As described above, in a state in which the communication device 201 and the electronic device 202 are electrically connected to each other (e.g., the contactor 450 of the communication device 201 is brought into contact with the connector 503 of the electronic device 202), when the first converter circuit 634 outputs power, power flowing along the second power line 921 due to the electrical connection drops to a high-level signal (e.g., a signal having a designated high value (e.g., Vcc, +5V)) through the first resistor 723 (e.g., a voltage and/or a current is dropped by a resistor), and the high-level signal may be transferred to the first conductor 42. The dropped high-level signal transferred to the first conductor 422 may be emitted to a ground through the at least one second conductor 423 electrically connected the first conductor 422 through the head 511 of the fastening member 510. When the high-level signal is emitted, a low-level signal may be transferred from the first conductor 422 to an input terminal of the first inverter 725. The first inverter 725 may invert the input low-level signal into a high-level signal, and may output the high-level signal through an output terminal thereof. The AND logic circuit 720 may receive, through the second input terminal, the high-level signal output from the first inverter 725.

When the communication device 201 and the electronic device 202 are not electrically connected to each other, power (or a high-level signal) is not applied to the first conductor 422, and thus the first conductor 422 may be in a floating state. In this case, there is no signal which is applied to the input terminal of the first inverter, and thus there may be also no signal which is output from the output terminal the first inverter 725. In other words, when the communication device 201 is not electrically connected to the electronic device 202, there may be no signal applied to the second input terminal of the AND logic circuit 720.

According to various embodiments, in operation 803, when the third conductor 426 is electrically connected to the at least one fourth conductor 427, the communication device 201 may receive a third signal through the third conductor 426. For example, as illustrated in FIG. 9, the control circuit (e.g., 690 in FIG. 6) (e.g., the AND logic circuit 720) may receive, through a third input terminal, a high-level signal (e.g., the third signal) or a low-level signal based on whether lower-surface ground pads (e.g., the third conductor 426 and the at least one fourth conductor 427) disposed on the lower surface of the second substrate 410 of the communication device 201 are electrically connected to each other. The third input terminal of the AND logic circuit 720 may be connected, through the inverter 726, to a ground pad (e.g., the third conductor 426), which is floated (or is not connected to the ground), among lower-surface ground pads, and may be connected to a power line (e.g., a second power line connected to the input terminal of the second converter circuit 680) through a second resistor. The state of electrical connection between the lower-surface ground pads 426 and 427 may be changed depending on whether the lower-surface ground pads 426 and 427 of the second substrate 410 of the communication device 201 is brought into contact with a ground pad on the first substrate of the electronic device 202, and a high-level signal or a low-level signal may be generated based on the change in the connection state. The third input terminal of the AND logic circuit 720 may receive the high-level signal or the low-level signal generated based on the change in the electrical connection state. Hereinafter, a description will be further made of a change in electrical connection the lower-surface ground pads 426 and 427 and an example of an operation of receiving a high-level signal or a low-level signal by the AND logic circuit 720 based on the change in the electrical connection state.

According to various embodiments, when the lower-surface ground pads are electrically disconnected from each other, the AND logic circuit 720 may receive a low-level signal (e.g., a signal having a designated low value). For example, as illustrated in 1011 of FIG. 10B, lower-surface ground pads (e.g., the third conductor 426 and the at least one fourth conductor 427 electrically disconnected from the third conductor 426) disposed while being spaced apart from each other on the lower surface of the second substrate 410 of the communication device 201 may be electrically disconnected from each other. When the communication device 201 is completely inserted into the electronic device 202, the first converter circuit 634 of the electronic device 202 and the second converter circuit 680 of the communication device 201 may be electrically connected to each other. When the first converter circuit 634 outputs power, power flowing along the second power line 921 due to the electrical connection drops to a high-level signal (e.g., a signal having a designated high value (e.g., Vcc, +5V)) through the second resistor 724 (e.g., a voltage and/or a current is dropped by a resistor), and the high-level signal may be transferred to an input terminal of the second inverter through the third conductor 426 connected to the second resistor 724. The second inverter 726 may invert the high-level signal into a low-level signal, and may output the low-level signal through an output terminal. The AND logic circuit 720 may receive, through the third input terminal, the low-level signal that has been output from the second inverter 726.

According to various embodiments, when the lower-surface ground pads 426 and 427 are electrically connected to each other, the AND logic circuit 720 may receive a high-level signal (e.g., a signal having a designated high value). For example, as illustrated in 1012 of FIG. 10B, the above-described state in which the second substrate 410 of the communication device 201 is completely inserted into the slot 360 of the electronic device 202, the fastening member 510 may be inserted into the fastening structure of the electronic device 202 through the recessed region of the fastening structure of the second substrate 410 of the communication device 201. Due to the inserted fastening member 510, force is applied from the upper surface of the first substrate 310 of the electronic device 202 toward the second substrate 410 of the communication device 201, and thus the lower surface of the second substrate 410 may be brought into close contact with the upper surface of the first substrate 310. Due to the close contact, the ground pad 371 of the first substrate 310 may be brought into contact with all of the lower-surface ground pads (e.g., the first conductor 422 and the first conductor 422 and the at least one second conductor 423 electrically disconnected from the first conductor 422) of the second substrate 410, which are electrically disconnected from each other. The lower-surface ground pads may be electrically connected to each other through the contacted ground pad 371 of the first substrate 310. As described above, in the state in which the communication device 201 is electrically connected to the electronic device 202 (e.g., the contactor 450 of the communication device 201 is in contact with the connector 503 of the electronic device 202), when the first converter circuit 634 outputs power, power flowing along the second power line 921 due to the electrical connection drops to a high-level signal (e.g., a signal having a designated high value (e.g., Vcc, +5V)) through the second resistor 724 (e.g., a voltage and/or a current is dropped by a resistor), and the high-level signal may be transferred to the third conductor 426. The dropped high-level signal transferred to the second conductor 423 may be emitted to a ground through the at least one fourth conductor 427 electrically connected to the third conductor 426 through a ground pad of the first substrate. When the high-level signal is emitted, a low-level signal may be transferred from the third conductor 426 to the input terminal of the second inverter 726. The second inverter 726 may invert the input low-level signal into a high-level signal, and may output the high-level signal through an output terminal. The AND logic circuit 720 may receive, through the third input terminal, the high-level signal that has been output from the second inverter 726.

When the communication device 201 is not electrically connected to the electronic device 202, like the first conductor 422, power (or a high-level signal) is not applied to the third conductor 426, and thus the third conductor 426 may be in a floating state. In other words, when the communication device 201 is not electrically connected to the electronic device 202, there may be no signal that is applied to the third input terminal of the AND logic circuit 720.

According to various embodiments, in operation 804, the communication device 201 may output, based on the first signal, the second signal, and the third signal, a control signal for controlling a converter. For example, as illustrated in FIG. 9, the AND logic circuit 720 may output a high-level signal (or a control signal) in response to receiving high-level signals through all input terminals (e.g., the first input terminal, the second input terminal, and the third input terminal). The high-level signal output from the AND logic circuit 720 may be configured to induce the second converter circuit 680 of the communication device 201 to perform an operation. The second converter circuit 680 may be driven in response to receiving of the control signal, and the driven second converter circuit 680 may convert power received, through the second power line 921, from a power line 911 connected to the output terminal of the first converter circuit 634, and may provide the converted power to other devices (e.g., the second processor 650) of the communication device 201. The other devices of the communication device 201 may be driven in response to being provided with the power to perform an operation.

Without being limited to the description, the communication device 201 may include various other types of devices, in place of the second converter circuit 680, for distributing power and providing the power to the remaining elements of the communication device 201. Like the second converter circuit 680, the devices are driven based on a control signal received from the control circuit (e.g., 690 in FIG. 6) (e.g., the AND logic circuit 720), and depending on the driving, may distribute, to the remaining elements of the communication device 201, power received from the electronic device 202 as it is or with conversion of the power.

Hereinafter, a description will be made of examples of an operation of the communication device 201 according to various embodiments.

According to various embodiments, the communication device 201 (e.g., the control circuit 690) may transmit, to the electronic device 202, a feedback signal indicating whether the communication device 201 is fastened by the fastening member and/or whether the lower surface of the second substrate 410 of the communication device 201 is brought into contact with the ground pad 371 of the first substrate 310 of the electronic device 202. The electronic device 202 may transmit a control signal or power to the communication device 201 based on the received feedback signal.

Figure 11:
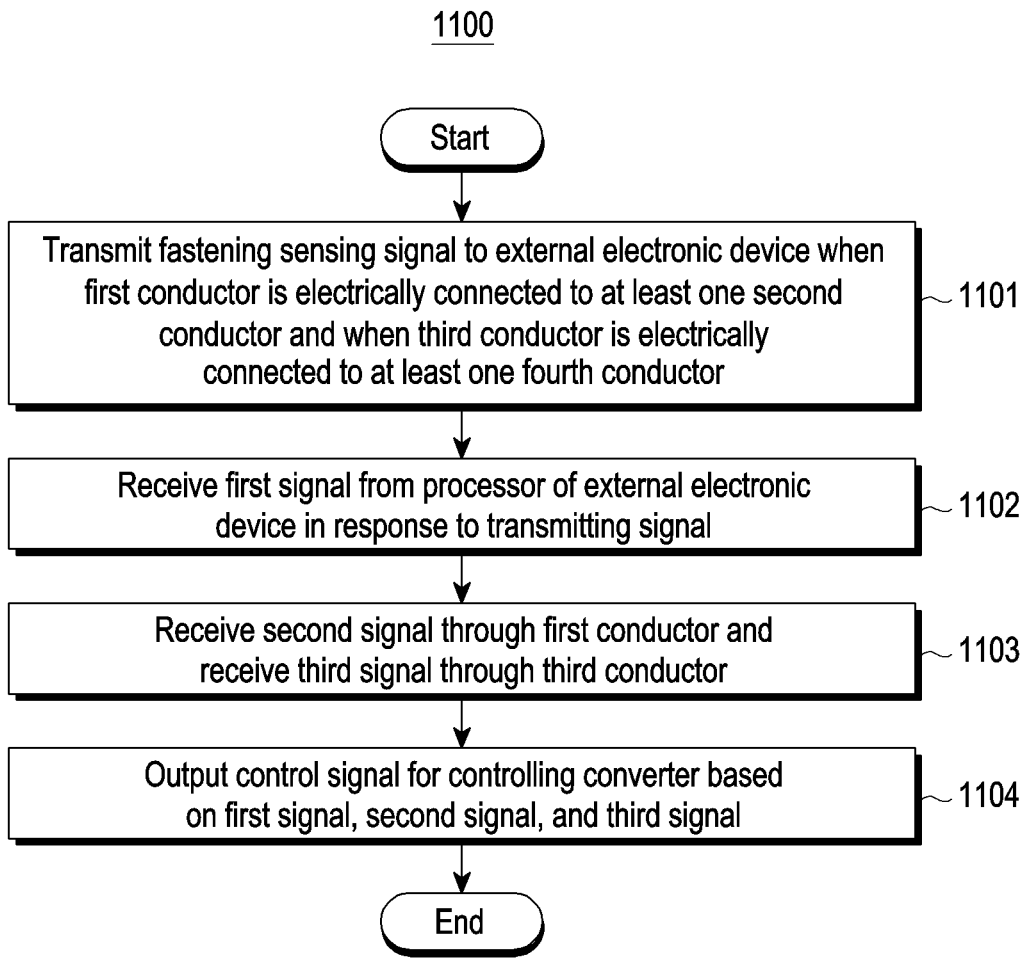
FIG. 11 is a flowchart illustrating one example of an operation of a communication device according to various embodiments.

FIG. 11 is a flowchart 1100 illustrating one example of an operation of a communication device according to various embodiments. According to various embodiments, the operations illustrated in FIG. 11 may be performed in various orders without being limited to the illustrated order. Further, according to various embodiments, more operations than the operations illustrated in FIG. 11 may be performed, or at least one operation that is fewer than the operations illustrated in FIG. 11 may be performed. Hereinafter, FIG. 11 will be described with reference to FIG. 12.

Figure 12:
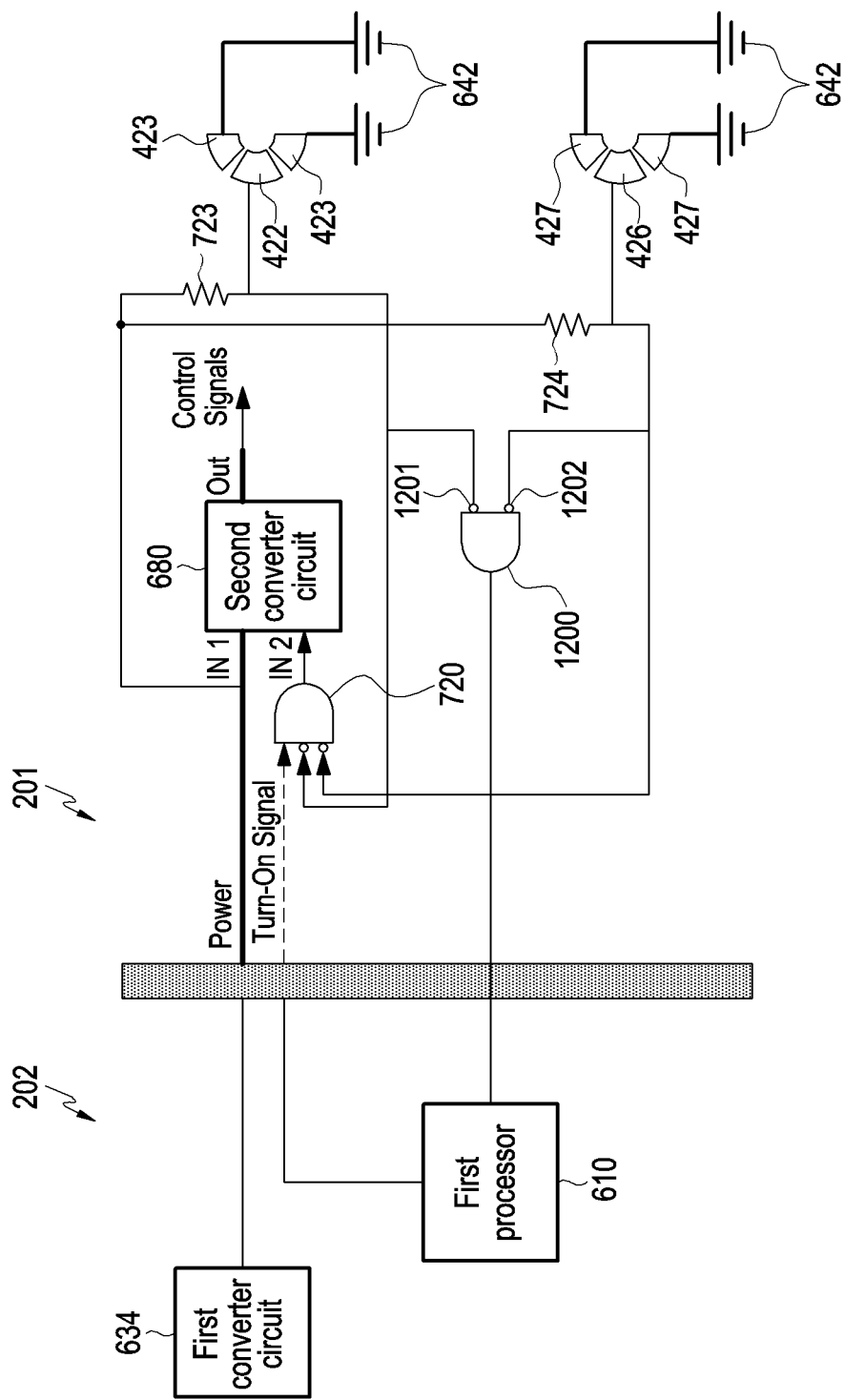
FIG. 12 is a view illustrating one example of an operation of transmitting a feedback signal, based on whether a communication device according to various embodiments fastened and/or whether the communication device is brought into contact with a ground pad of a first substrate of an electronic device, and receiving a control signal from the electronic device.

FIG. 12 is a view illustrating one example of an operation of transmitting a feedback signal based on whether a communication device various embodiments is fastened and/or whether the communication device is brought into contact with a ground pad of a first substrate of an electronic device, and receiving a control signal from the electronic device.

According to various embodiments, in operation 1101, when the first conductor 422 is electrically connected to the at least one second conductor 423, and when the third conductor 426 is electrically connected to at least one fourth conductor 427, the communication device 201 may transmit a fastening sensing signal to the external electronic device 202. For example, as illustrated in FIG. 12, the communication device 201 may further include a first control circuit (e.g., 1200) (e.g., the AND logic circuit) for outputting a signal based on whether the communication device 201 is fastened by the fastening member and whether the lower surface of the second substrate 410 of the communication device 201 is brought into contact with a ground pad of the first substrate 310 of the electronic device 202. One input terminal (e.g., a fourth input terminal) of two input terminals (e.g., the fourth input terminal and a fifth input terminal) of the first control circuit (e.g., 1200) may be connected to an inverter 1201 connected to a ground pad (e.g., the first conductor 422), which is not connected to a ground, among upper-surface ground pads, the other input terminal (e.g., the fifth input terminal) may be connected to an inverter 1202 connected to a ground pad (e.g., the third conductor 426), which is not connected to the ground, among lower-surface ground pads.

According to various embodiments, when the upper-surface ground pads 422 and 423 are electrically connected to each other and when the lower-surface ground pads 426 and 427 are electrically connected to each other, the first control circuit 1200 may receive a high-level signal through the two input terminals, and may transmit, based on the reception of the high-level signal, a control signal to the first processor 610 of the electronic device 202. When the communication device 201 is electrically connected to the electronic device 202 (e.g., the contactor of the communication device 201 is brought into contact with the connector of the electronic device 202), the first control circuit 1200 may be electrically connected to the first processor 610 of the electronic device 202. For example, a signal line connected to an output terminal of the first control circuit 1200 may be electrically connected to a signal line connected to the input terminal of the first processor 610 of the electronic device 202. As described above, when the upper-surface and lower-surface ground pads are electrically connected, a low-level signal may be generated in floated ground pads (e.g., the first conductor 422 and third conductor 426). Each of the inverters (e.g., 1201 and 1202) may convert the low-level signal into a high-level signal, and may transmit the high-level signal to the input terminals (e.g., the fourth input terminal and the fifth input terminal) of the first control circuit 1200. The first control circuit 1200 may output a control signal in response to the reception of the high-level signal through the input terminals. For example, the control signal may indicate that the communication device 201 is fastened by the fastening member 510 and that the lower surface of the second substrate 410 of the communication device 201 is brought into contact with the ground pad 371 of the first substrate 310 of the electronic device 202.

According to various embodiments, in operation 1102, the communication device 201 (e.g., the control circuit) may receive a first signal from the first processor 610 of the external electronic device 202 in response to transmitting the signal. For example, the first processor 610 of the electronic device 202 may output, in response to receiving the control signal from the first control circuit 1200, a control signal for turning on the second converter circuit 680. As described in relation to FIGS. 8, 9, 10A, and 10B, the control circuit 720 may receive the control signal through the first input terminal. An operation of receiving a signal by the control circuit 720 through the first input terminal may be performed like the above-described operation 801 of the communication device 201, and thus a redundant description thereof will be omitted. In another example, based on the reception of the first signal, the first processor 610 may transmit, to the first converter circuit 634, a control signal for controlling the first converter circuit 634 to transmit power to the second converter circuit 680.

According to various embodiments, in operation 1103, the communication device 201 (e.g., the control circuit) may receive a second signal through the first conductor 422 and a third signal through the third conductor 426, and, in operation 1104, may output, based on the first signal, the second signal, and the third signal, a control signal for controlling a converter. For example, the control circuit 720 may receive a high-level signal (e.g., the second signal) through the second input terminal when the upper-surface ground pads (e.g., the first conductor 422 and the at least one second conductor 423) are electrically connected to each other, and may receive a high-level signal (e.g., the third signal) through the third input terminal when the lower-surface ground pads (e.g., the third conductor 426 and the at least one fourth conductor 427) are electrically connected to each other. The operation of receiving signals through the second input terminal and the third input terminal of the control circuit 720 may be performed like the above-described operations 802 and 803 of the communication device 201, and thus a redundant description thereof will be omitted. The control circuit 720 may output, in response to the reception of the high-level signals through all of the input terminals (e.g., the first input terminal, the second input terminal, and the third input terminal), a control signal for controlling (and/or driving) the second converter circuit 680. The operation of outputting the control signal by the control circuit 720 may be performed like the above-described operation 804 of the communication device 201, and thus a redundant description thereof will be omitted.

Hereinafter, a description will be made of examples of operations of various types of electronic devices according to various embodiments.

According to various embodiments, as described above, the above-described matters (e.g., electrical disconnection between ground pads, and the control circuit 690 (e.g., the AND logic circuit 720)) may be applied to various types of devices (e.g., a memory card and a graphic card), which can be inserted into the electronic device 202, in addition to the communication device 201.

Further, according to various embodiments, multiple fastening structures may be formed on a substrate of each of the devices (e.g., a memory card and a graphic card), and ground pads electrically disconnected from each other may be disposed in a region adjacent to the multiple fastening structures. As described above, some of the disconnected ground pads may not be connected to a ground, and the other ground pads may be connected to the ground. A control circuit of the device may be connected to some of the ground pads so as to receive a signal and perform an operation, based on whether the substrate is fastened and/or whether the substrate is brought into contact with the ground pad 371 on the first substrate 310 of the electronic device 202.

Figure 13:
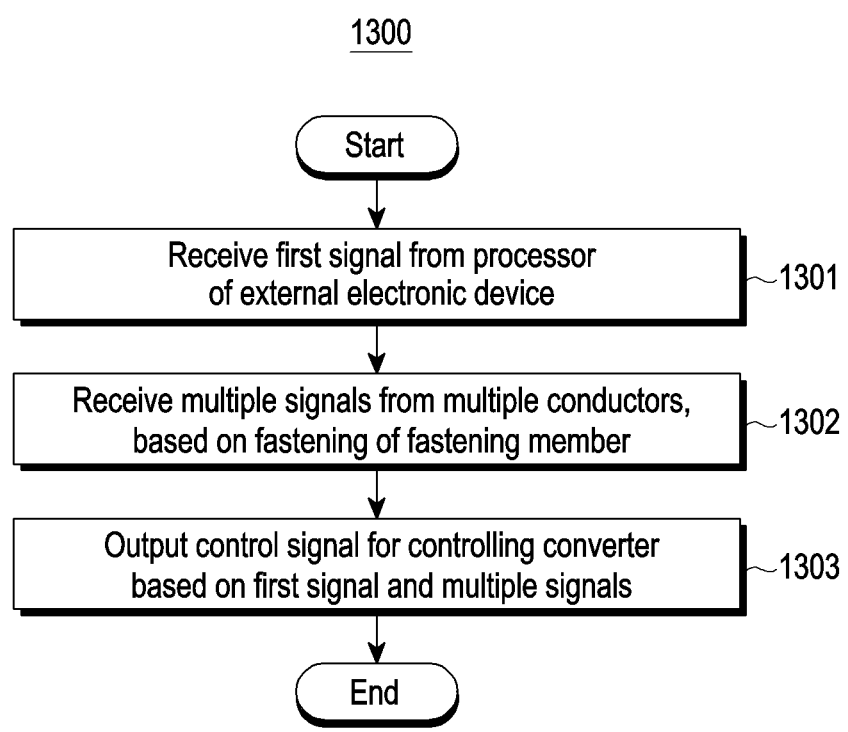
FIG. 13 is a flowchart illustrating one example of an operation of a device according to various embodiments.

FIG. 13 is a flowchart 1300 illustrating one example of an operation of a device according to various embodiments. According to various embodiments, the operations illustrated in FIG. 13 may be performed in various orders without being limited to the illustrated order. Further, according to various embodiments, more operations than the operations illustrated in FIG. 13 may be performed, or at least one operation that is fewer than the operations illustrated in FIG. 13 may be performed. Hereinafter, FIG. 13 will be described with reference to FIG. 14.

Figure 14:
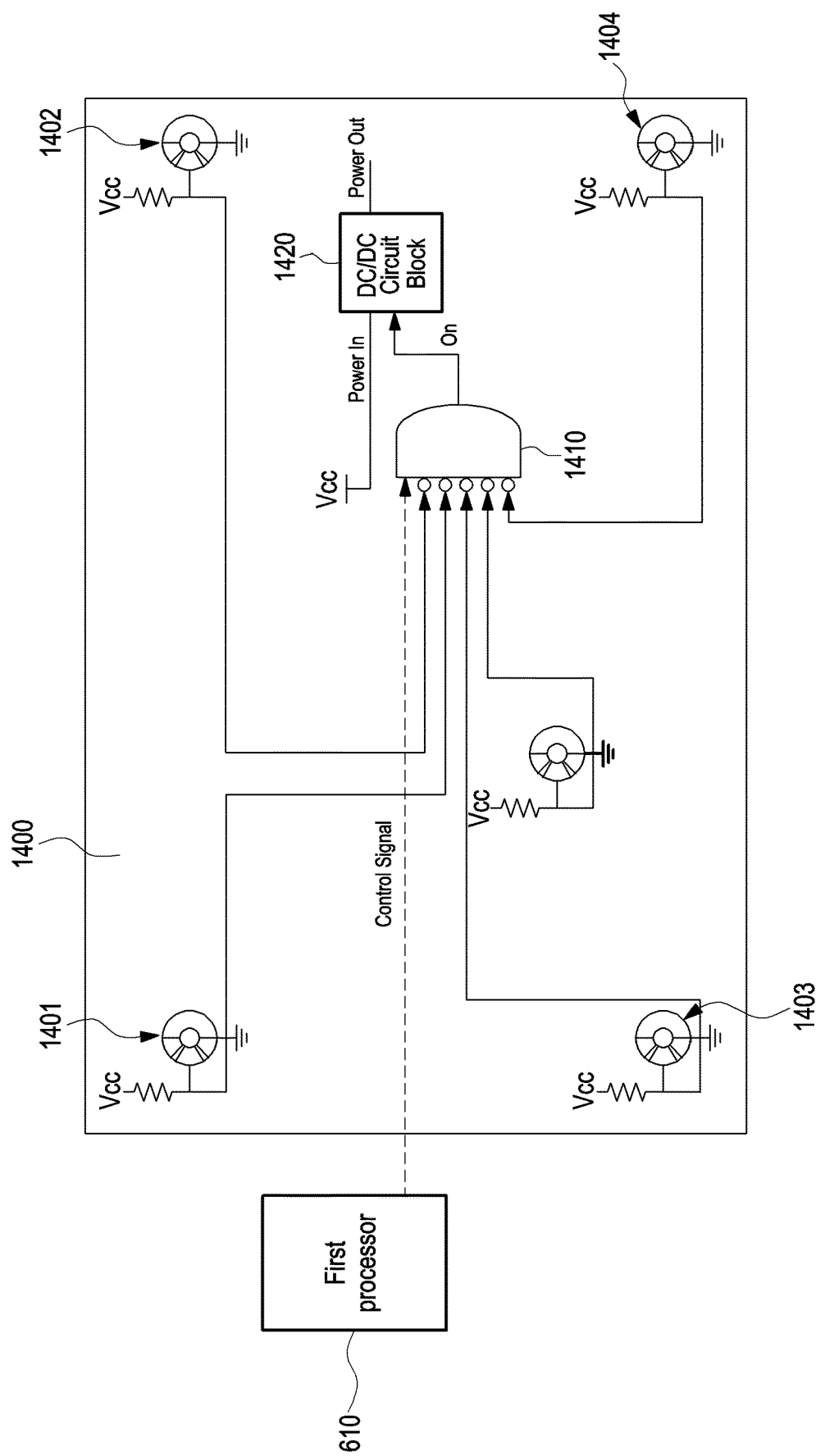
FIG. 14 is a view illustrating one example of an operation of transmitting a feedback signal, based on whether a device according to various embodiments is fastened and/or whether the device is brought into contact with a ground pad of a first substrate of an electronic device, and receiving a control signal from the device.

FIG. 14 is a view illustrating one example of an operation of transmitting a feedback signal based on whether a device according to various embodiments is fastened and/or whether the device is brought into contact with a ground pad of a first substrate of an electronic device, and receiving a control signal from the device.

According to various embodiments, in operation 1301, a first device (e.g., a memory card or a graphic card) may receive a first signal from a processor of an external electrical device. For example, when the first device (e.g., a memory card or a graphic card) is inserted into the electronic device 202 (e.g., Note PC), the first device may be electrically connected to the electronic device 202. For example, as illustrated in FIG. 14, one input terminal (e.g., the first input terminal) of multiple input terminals of a control circuit of the first device may be electrically connected to the first processor 610 of the electronic device 202. A first input terminal of a control circuit 1410 (e.g., the AND logic circuit) may receive a control signal that is output from the first processor 610. The operation of receiving the first signal may be performed like the above-described operation 801 and operations 1101 and 1102 of the communication device 201, and thus a redundant description thereof will be omitted.

According to various embodiments, in operation 1302, the device (e.g., a memory card or a graphic card) may receive multiple signals from multiple conductors based on fastening of a fastening member. For example, the other input terminals of the multiple input terminals of the control circuit 1410 of the first device may be electrically connected to some ground pads, which are not connected to a ground, among ground pads 1401, 1402, 1403, and 1404 which are disposed in a region adjacent to multiple fastening structures of a substrate 1400 of the first device. As illustrated in relation to FIGS. 8, 9, 10A, and 10B, the electrical connection may be performed by the head of the fastening member in the case of upper-surface ground pads, and may be performed by a ground pad of the first substrate of the electronic device 202 in the case of lower-surface ground pads, and thus a redundant description thereof will be omitted. The some ground pads which are not connected to the ground may be connected to a power line, and may receive a high-level signal that has been dropped by a resistor. When the ground pads 1401, 1402, 1403, and 1404 are electrically connected to each other, a high-level signal may be emitted through other ground pads which are connected to the ground, and each of inverters connected to the other input terminals of the control circuit 1410 may convert a low-level signal, generated based on the emission of the high-level signal, into a high-level signal. Each of the input terminals of the control circuit 1410 may receive the high-level signal converted by each of the inverters. The operation of receiving a high-level signal or a low-level signal by the control circuit based on the ground pads 1401, 1402, 1403, and 1404 are electrically connected to each other may be as described in operations 802 and 803 of the communication device 201, and thus a redundant description thereof will be omitted.

According to various embodiments, in operation 1303, the device (e.g., a memory card or a graphic card) may output, based on the first signal and the multiple signals, a control signal for controlling a converter. For example, the above-described control circuit 1410 may output, in response to receiving a high-level signal through the multiple input terminals, a control signal for controlling a converter circuit 1420. The operation of outputting the control signal by the control circuit 1410 may be performed like the above-described operation 804 of the communication device 201, and thus a redundant description thereof will be omitted.

Hereinafter, examples of operations of various types of electronic devices according to various embodiments will be described.

According to various embodiments, the electronic device 202 may include a circuit for determining whether the above-described communication device 201 is fastened and/or whether the communication device 201 is fastened to the ground pad 370 of the first substrate 310 of the electronic device 202. When the circuit determines whether the above-described communication device 201 is fastened and/or whether the communication device 201 is fastened to the ground pad 371 of the first substrate 310 of the electronic device 202, the electronic device 202 may transmit a control signal (e.g., a converter circuit turn-on signal) and/or power to the communication device 201.

Figure 15:
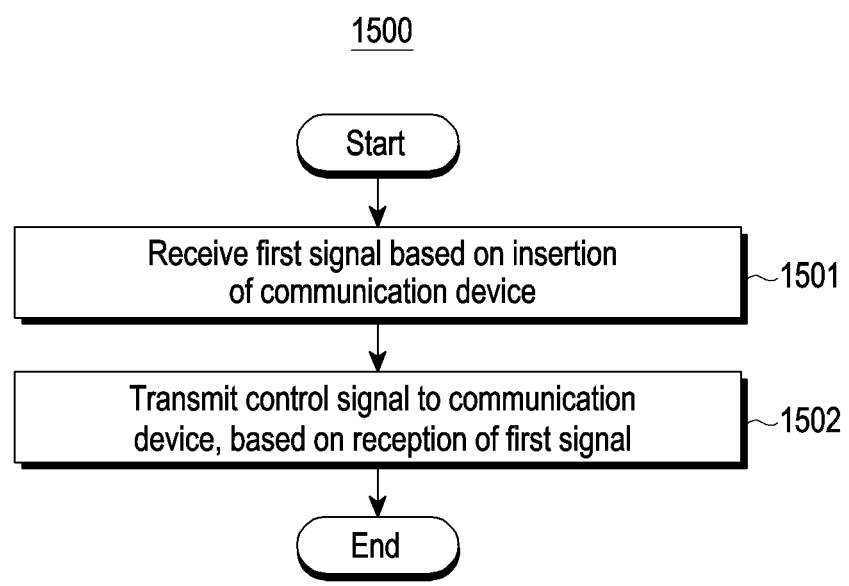
FIG. 15 is a flowchart illustrating one example of an operation of a device according to various embodiments.

FIG. 15 is a flowchart 1500 illustrating one example of an operation of a device according to various embodiments. According to various embodiments, the operations illustrated in FIG. 15 may be performed in various orders without being limited to the illustrated order. Further, according to various embodiments, more operations than the operations illustrated in FIG. 15 may be performed, or at least one operation that is fewer than the operations illustrated in FIG. 15 may be performed. Hereinafter, FIG. 15 will be described with reference to FIGS. 16A and 16B.

Figure 16A:
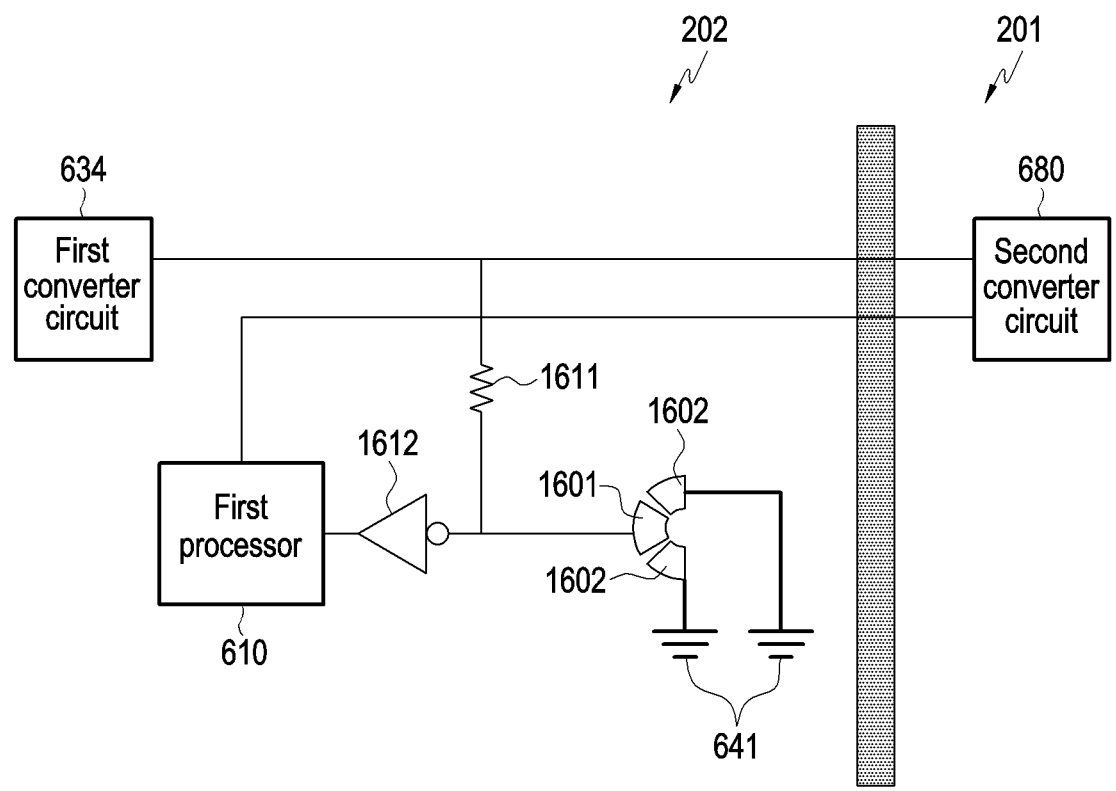
FIG. 16A is a view illustrating one example of an operation of transmitting a control signal and/or power to a communication device, based on whether a ground pad of an electronic device according to various embodiments is brought into contact with the communication device.
Figure 16B:
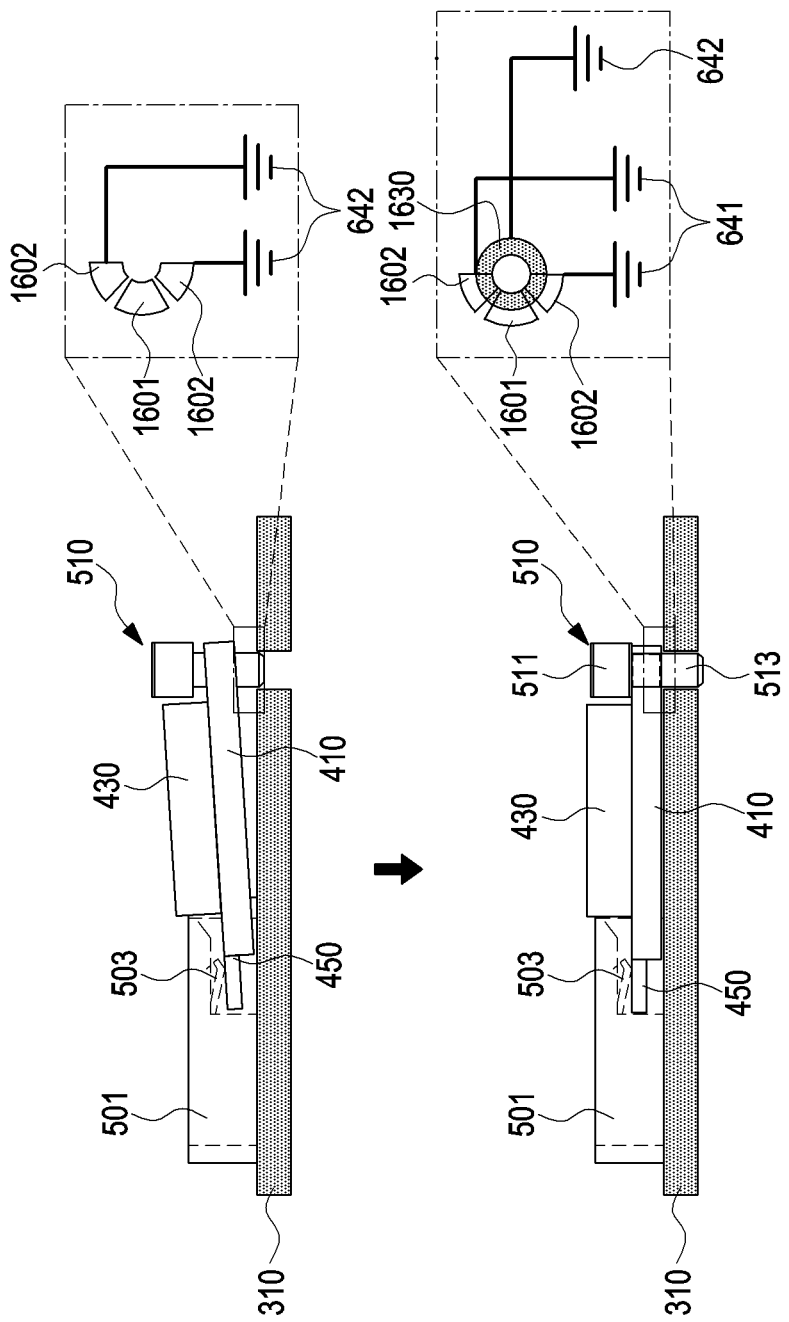
FIG. 16B is a view illustrating one example of electrical connection between electrically disconnected ground pads of an electronic device according to various embodiments.

FIG. 16A is a view illustrating one example of an operation of transmitting a control signal and/or power to a communication device, based on whether a ground pad of an electronic device, according to various embodiments is brought into contact with the communication device. FIG. 16B is a view illustrating one example of electrical connection between electrically disconnected ground pads of an electronic device according to various embodiments.

According to various embodiments, in operation 1501, the electronic device 202 may receive a first signal, based on insertion of the communication device 201. For example, referring to FIG. 16A, the first processor 610 of the electronic device 202 may receive a high-level signal based on whether ground pads 1601 and 1602, which are disposed to be spaced apart from each other on the first substrate 310 and are electrically disconnected from each other, are electrically connected to each other. One 1601, which is not connected to a ground, among the ground pads 1601 and 1602 may be connected to a power line through a resistor 1611, the other 1602 thereof may be connected to the ground 641. As illustrated in FIG. 16B, the ground pads 1601 and 1602, which are electrically disconnected from each other while being spaced apart from each other, are brought into contact with a lower-surface ground pad 1630 formed on the lower surface of the second substrate 410 of the communication device 201, and thus may be electrically connected to each other through the lower-surface ground pad. In this case, the high-level signal dropped by the resistor 1611 through the power line (e.g., a power line output from the first converter circuit 634) applied to one, which is not connected to the ground 1601, among the ground pads 1601 and 1602, may be emitted through the other 1602, which is connected to the ground, among the ground pads 1601 and 1602 according to the electrical connection. A low-level signal may be generated based on the emission of the high-level signal, and the generated low-level signal may be converted into a high-level signal by an inverter 1612, and transferred to the first processor 610.

As illustrated in FIG. 16B, the lower-surface ground pad 1630 of the second substrate 410 of the communication device 201 may be formed in an integrated type (or may be formed in an electrically unseparated type). Alternatively, the lower-surface ground pads (not shown) may be disposed to be electrically disconnected from each other, and the lower-surface ground pads may be implemented at a position corresponding to a spacing between the ground pads 1601 and the 1602 formed on the first substrate 310 so as to have a size that is larger than the size of the spacing. Thus, the ground pads 1601 and 1602 on the first substrate 310 of the electronic device 202 may be electrically connected to each other by the lower-surface ground pads spaced apart from each other. Further, although not illustrated, the above-described control circuit (e.g., the control circuit in FIG. 9) may also implemented in the communication device 201, and thus the first processor 610 may receive a signal based on not only whether the ground pads of the first substrate 310 are electrically connected to each other but also the ground pads (e.g., lower-surface ground pads and upper-surface ground pads) of the second substrate 410 of the communication device 201 are electrically connected to each other. For example, the first processor 610 may include two input terminals, and each of the two input terminals may be implemented so as to receive a high-level signal based on electrical connection between the ground pads disposed on the upper surface of the first substrate 310 and the lower surface of the second substrate 410.

According to various embodiments, in operation 1502, the electronic device 202 may transmit a control signal to the communication device 201 based on the reception of the first signal. For example, the first processor 610 may transmit, based on the reception of the first signal, a control signal for turning on the second converter circuit 680. In another example, the first processor 610 may transfer, based on the reception of the first signal, a control signal for controlling the first converter circuit 634 to transfer power to the second converter circuit 680 to the first converter circuit 634.

According to various embodiments, a communication device (e.g., 201 in FIG. 2) insertable into an external electronic device (e.g., 202 in FIG. 2) may be provided. The communication device (e.g., 201 in FIG. 2) includes a converter circuit (e.g., 680 in FIG. 6), a power line, a first conductor (e.g., 422 in FIG. 7B) connected to the power line, and at least one second conductor (e.g., 423 in FIG. 7B) electrically disconnected from the first conductor (e.g., 422 in FIG. 7B) and connected to a ground, the first conductor (e.g., 422 in FIG. 7B) being electrically connected to the at least one second conductor (e.g., 423 in FIG. 7B) by fastening between the communication device (e.g., 201 in FIG. 2) and the external electronic device (e.g., 202 in FIG. 2), a signal line, and a control circuit (e.g., 720 in FIG. 7B) connected to the power line, the first conductor (e.g., 422 in FIG. 7B), and the signal line, wherein the control circuit (e.g., 720 in FIG. 7B) is configured to receive a first signal from a processor of the external electronic device (e.g., 202 in FIG. 2) through the signal line, receive a second signal generated based on a discharging of a power flowing along the power line to the ground through the at least one second conductor (e.g., 423 in FIG. 7B) when the first conductor (e.g., 422 in FIG. 7B) is electrically connected to the at least one second conductor (e.g., 423 in FIG. 7B), and output, based on the first signal and the second signal, a control signal to the converter circuit for controlling the converter circuit.

According to various embodiments, the communication device (e.g., 201 in FIG. 2) may be provided wherein the control circuit (e.g., 720 in FIG. 7B) is configured to refrain from outputting the control signal for controlling the converter circuit, based on receiving a third signal generated during electrical disconnection between the first conductor (e.g., 422 in FIG. 7B) and the at least one second conductor (e.g., 423 in FIG. 7B) while receiving the first signal through the signal line.

According to various embodiments, the communication device (e.g., 201 in FIG. 2) may be provided wherein, when the communication device (e.g., 201 in FIG. 2) is inserted into a slot of a substrate of the external electronic device (e.g., 202 in FIG. 2), the signal line is electrically connected to the processor of the external electronic device (e.g., 202 in FIG. 2), and the power line is electrically connected to a first converter circuit of the external electronic device (e.g., 202 in FIG. 2).

According to various embodiments, the communication device (e.g., 201 in FIG. 2) may be provided wherein the control circuit (e.g., 720 in FIG. 7B) is configured to receive the first signal from the processor when the signal line is electrically connected to the processor of the external electronic device (e.g., 202 in FIG. 2), and the converter circuit is configured to receive power when the power line is electrically connected to the first converter circuit of the external electronic device (e.g., 202 in FIG. 2).

According to various embodiments, the communication device (e.g., 201 in FIG. 2) may be provided wherein the converter circuit is configured to convert, based on the reception of the control signal, power received through the power line and supply the converted power to other electrical components of the communication device (e.g., 201 in FIG. 2).

According to various embodiments, the communication device (e.g., 201 in FIG. 2) may be provided wherein the communication device (e.g., 201 in FIG. 2) is a communication device (e.g., 201 in FIG. 2) of an M.2 specification.

According to various embodiments, the communication device (e.g., 201 in FIG. 2) may be provided, and further includes a first substrate, wherein the first conductor (e.g., 422 in FIG. 7B) and the at least one second conductor (e.g., 423 in FIG. 7B) are disposed on the upper surface of the first substrate, wherein the first conductor and the at least one second conductor are spaced apart from each other, and a region recessed with a predetermined curvature inward from the side surface of the substrate is formed adjacent to the first conductor (e.g., 422 in FIG. 7B) and the at least one second conductor (e.g., 423 in FIG. 7B).

According to various embodiments, the communication device (e.g., 201 in FIG. 2) may be provided wherein a fastening member vertically inserted through the recessed region is contacted with both of the first conductor (e.g., 422 in FIG. 7B) and the at least one second conductor (e.g., 423 in FIG. 7B) while the communication device (e.g., 201 in FIG. 2) is inserted into a slot of a second substrate of an external electronic device (e.g., 202 in FIG. 2), and thus the first conductor (e.g., 422 in FIG. 7B) is electrically connected to the at least one second conductor (e.g., 423 in FIG. 7B) through the fastening member.

According to various embodiments, the communication device (e.g., 201 in FIG. 2) may be provided, and further includes a first resistor connected to the power line, and a first inverter, wherein the control circuit (e.g., 720 in FIG. 7B) is an AND logic circuit including a first input terminal and a second input terminal, the first input terminal of the control circuit (e.g., 720 in FIG. 7B) is connected to the signal line, the second input terminal of the control circuit (e.g., 720 in FIG. 7B) is connected, through the first inverter, to the first resistor connected to the power line and is connected to the first conductor (e.g., 422 in FIG. 7B) through the first inverter, and the control circuit (e.g., 720 in FIG. 7B) is configured to receive the first signal from the processor of the external electronic device (e.g., 202 in FIG. 2) through the first input terminal, and receive, through the second input terminal, the second signal of a high level that is generated from the first invert by discharging the power flowing along the power line to the ground through the first resistor, the first conductor (e.g., 422 in FIG. 7B), and the at least one second conductor (e.g., 423 in FIG. 7B) when the first conductor (e.g., 422 in FIG. 7B) is electrically connected to the at least one second conductor (e.g., 423 in FIG. 7B).

According to various embodiments, the communication device (e.g., 201 in FIG. 2) may be provided, and further includes a third conductor (e.g., 426 in FIG. 7B) disposed on the lower surface of the first substrate and connected to the power line and at least one fourth conductor (e.g., 427 in FIG. 7B) electrically disconnected from the third conductor (e.g., 426 in FIG. 7B) and connected to the ground, wherein the control circuit (e.g., 720 in FIG. 7B) is connected to the third conductor (e.g., 426 in FIG. 7B), and the control circuit (e.g., 720 in FIG. 7B) is configured to receive the first signal from the processor of the external electronic device (e.g., 202 in FIG. 2), receive the second signal when the first conductor (e.g., 422 in FIG. 7B) is electrically connected to the at least one second conductor (e.g., 423 in FIG. 7B), receive a third signal generated by discharging power flowing along the power line to the ground through the at least one fourth conductor (e.g., 427 in FIG. 7B) when the third conductor (e.g., 426 in FIG. 7B) is electrically connected to the at least one fourth conductor (e.g., 427 in FIG. 7B), and output, based on the first signal, the second signal, and the third signal, the control signal for controlling the converter circuit to the converter circuit.

According to various embodiments, the communication device (e.g., 201 in FIG. 2) may be provided wherein, in a state in which the communication device (e.g., 201 in FIG. 2) is inserted into a slot of a second substrate of the external electronic device (e.g., 202 in FIG. 2), the third conductor (e.g., 426 in FIG. 7B) disposed on the lower surface of the substrate is electrically connected to the at least one fourth conductor (e.g., 427 in FIG. 7B), based on a conductor of the second substrate of the external electronic device (e.g., 202 in FIG. 2).

According to various embodiments, the communication device (e.g., 201 in FIG. 2) may be provided, and further includes a first resistor and a second resistor connected to the power line, and a first inverter and a second inverter, wherein the control circuit (e.g., 720 in FIG. 7B) is an AND logic circuit including a first input terminal, a second input terminal, and a third input terminal, the first input terminal of the control circuit (e.g., 720 in FIG. 7B) is connected to the signal line, the second input terminal of the control circuit (e.g., 720 in FIG. 7B) is connected, through the first inverter, to the first resistor connected to the power line and is connected to the first conductor (e.g., 422 in FIG. 7B) through the first inverter, the second input terminal of the control circuit (e.g., 720 in FIG. 7B) is connected, through the second inverter, to the second resistor connected to the power line and is connected to the third conductor (e.g., 426 in FIG. 7B) through the second inverter, and the control circuit (e.g., 720 in FIG. 7B) is configured to receive the first signal from the processor of the external electronic device (e.g., 202 in FIG. 2) through the first input terminal, receive, through the second input terminal, the second signal of a high level that is generated from the first inverter by discharging the power flowing along the power line to the ground through the first resistor, the first conductor (e.g., 422 in FIG. 7B), and the at least one second conductor (e.g., 423 in FIG. 7B) when the first conductor (e.g., 422 in FIG. 7B) is electrically connected to the at least one second conductor (e.g., 423 in FIG. 7B), and receive, through the second input terminal, the third signal of a high level that is generated from the second inverter by discharging the power flowing along the power line to the ground through the second resistor, the third conductor (e.g., 426 in FIG. 7B), and the at least one fourth conductor (e.g., 427 in FIG. 7B) when the third conductor (e.g., 426 in FIG. 7B) is electrically connected to the at least one fourth conductor (e.g., 427 in FIG. 7B).

According to various embodiments, the communication device (e.g., 201 in FIG. 2) may be provided wherein the control circuit (e.g., 720 in FIG. 7B) is configured to receive the first signal from the processor in response to a signal transmitted to the external electronic device (e.g., 202 in FIG. 2), based on electrical connection between the first conductor (e.g., 422 in FIG. 7B) and the at least one second conductor (e.g., 423 in FIG. 7B).

According to various embodiments, a method of operating a communication device (e.g., 201 in FIG. 2) insertable into an external electronic device (e.g., 202 in FIG. 2) may be provided, and the method includes receiving a first signal from a processor of the external electronic device (e.g., 202 in FIG. 2) through a signal line, receiving a second signal generated by discharging, when a first conductor (e.g., 422 in FIG. 7B) connected to a power line is electrically connected to at least one second conductor (e.g., 423 in FIG. 7B) electrically disconnected from the first conductor (e.g., 422 in FIG. 7B) and connected to a ground, power flowing a power line to the ground through at least one second conductor (e.g., 423 in FIG. 7B), the first conductor (e.g., 422 in FIG. 7B) being electrically connected to the at least one second conductor (e.g., 423 in FIG. 7B) by fastening between the communication device (e.g., 201 in FIG. 2) and the external electronic device (e.g., 202 in FIG. 2), and outputting, based on the first signal and the second signal, a control signal to the converter circuit for controlling a converter circuit.

According to various embodiments, the method may be provided, wherein the method further includes refraining from outputting the control signal for controlling the converter circuit, based on receiving a third signal generated during electrical disconnection between the first conductor (e.g., 422 in FIG. 7B) and the at least one second conductor (e.g., 423 in FIG. 7B) while receiving the first signal through the signal line.

According to various embodiments, the method may be provided wherein, when the communication device (e.g., 201 in FIG. 2) is inserted into a slot of a substrate of the external electronic device (e.g., 202 in FIG. 2), the signal line is electrically connected to the processor of the external electronic device (e.g., 202 in FIG. 2), and the power line is electrically connected to a first converter circuit of the external electronic device (e.g., 202 in FIG. 2).

According to various embodiments, the method may be provided, wherein the operation further includes receiving the first signal from the processor when the signal line is electrically connected to the processor of the external electronic device (e.g., 202 in FIG. 2), and the converter circuit is configured to receive power when the power line is electrically connected to the first converter circuit of the external electronic device (e.g., 202 in FIG. 2).

According to various embodiments, the method may be provided wherein the converter circuit is configured to convert, based on the reception of the control signal, power received through the power line and supply the converted power to other elements of the communication device (e.g., 201 in FIG. 2).

According to various embodiments, a communication device (e.g., 201 in FIG. 2) may be provided, and includes a converter circuit, a power line, a first conductor (e.g., 422 in FIG. 7B) connected to the power line, and at least one second conductor (e.g., 423 in FIG. 7B) electrically disconnected from the first conductor (e.g., 422 in FIG. 7B) and connected to a ground, the first conductor (e.g., 422 in FIG. 7B) being electrically connected to the at least one second conductor (e.g., 423 in FIG. 7B) by fastening between the communication device (e.g., 201 in FIG. 2) and the external electronic device (e.g., 202 in FIG. 2), a signal line, and a logic circuit including a first input terminal connected to the power line and the first conductor (e.g., 422 in FIG. 7B), and a second input terminal connected to the signal line, wherein the logic circuit is configured to receive a first signal from a processor of the external electronic device (e.g., 202 in FIG. 2) through the first input terminal, receive a second signal through the second input terminal, and output, based on that the signal level of the second signal is a designated level, a control signal for controlling the converter circuit to the converter circuit.

According to various embodiments, a communication device (e.g., 201 in FIG. 2) insertable into an external electronic device (e.g., 202 in FIG. 2) may be provided. The communication device (e.g., 201 in FIG. 2) includes a first substrate, a converter circuit, a power line, a first conductor (e.g., 422 in FIG. 7B) disposed on the upper surface of the first substrate and connected to the power line, and at least one second conductor (e.g., 423 in FIG. 7B) electrically disconnected from the first conductor (e.g., 422 in FIG. 7B) and connected to a ground, the first conductor (e.g., 422 in FIG. 7B) being electrically connected to the at least one second conductor (e.g., 423 in FIG. 7B) by fastening between the communication device (e.g., 201 in FIG. 2) and the external electronic device (e.g., 202 in FIG. 2), a third conductor (e.g., 426 in FIG. 7B) disposed on the lower surface of the first substrate and connected to the power line, and at least one fourth conductor (e.g., 427 in FIG. 7B) electrically disconnected from the third conductor (e.g., 426 in FIG. 7B) and connected to the ground, the third conductor (e.g., 426 in FIG. 7B) being electrically connected to the at least one fourth conductor (e.g., 427 in FIG. 7B) by contact between the lower surface of the first substrate of the communication device (e.g., 201 in FIG. 2) and the upper surface of a second substrate of the external electronic device (e.g., 202 in FIG. 2), a signal line, and a control circuit (e.g., 720 in FIG. 7B) connected to the power line, the first conductor (e.g., 422 in FIG. 7B), the third conductor (e.g., 426 in FIG. 7B), and the signal line, wherein the control circuit (e.g., 720 in FIG. 7B) is configured to receive a first signal from a processor of the external electronic device (e.g., 202 in FIG. 2) through the signal line, receive a second signal generated by discharging power flowing along the power line to the ground through the at least one second conductor (e.g., 423 in FIG. 7B) when the first conductor (e.g., 422 in FIG. 7B) is electrically connected to the at least one second conductor (e.g., 423 in FIG. 7B), receive a third signal generated by discharging power flowing along the power line to the ground through the at least one fourth conductor (e.g., 427 in FIG. 7B) when the third conductor (e.g., 426 in FIG. 7B) is electrically connected to the at least one fourth conductor (e.g., 427) in FIG. 7B, and output, based on the first signal and the second signal, a control signal for controlling the converter circuit to the converter circuit.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A communication device insertable into an external electronic device, the communication device comprising:
   a converter circuit;
   a power line;
   a first conductor connected to the power line, and at least one second conductor electrically disconnected from the first conductor and connected to a ground, the first conductor being electrically connected to the at least one second conductor by fastening between the communication device and the external electronic device;
   a signal line; and
   a control circuit connected to the power line, the first conductor, and the signal line,
   wherein the control circuit is configured to:
      receive a first signal from a processor of the external electronic device through the signal line,
      receive a second signal generated based on a discharging of a power flowing along the power line to the ground through the at least one second conductor when the first conductor is electrically connected to the at least one second conductor,
      output, based on the first signal and the second signal, a control signal to the converter circuit for controlling the converter circuit, and
      refrain from outputting the control signal for controlling the converter circuit, based on receiving a third signal generated during electrical disconnection between the first conductor and the at least one second conductor while receiving the first signal through the signal line.

2. The communication device of claim 1, wherein, when the communication device is inserted into a slot of a substrate of the external electronic device, the signal line is electrically connected to the processor of the external electronic device, and the power line is electrically connected to a first converter circuit of the external electronic device.

3. The communication device of claim 2, wherein the control circuit is configured to receive the first signal from the processor when the signal line is electrically connected to the processor of the external electronic device, and the converter circuit is configured to receive the power when the power line is electrically connected to the first converter circuit of the external electronic device.

4. The communication device of claim 3, wherein the converter circuit is configured to convert, based on reception of the control signal, the power received through the power line and supply the converted power to other electrical components of the communication device.

5. The communication device of claim 1, wherein the communication device is a communication device of an M.2 specification.

6. The communication device of claim 1, further comprising a first substrate,
wherein the first conductor and the at least one second conductor are disposed on an upper surface of the first substrate,
wherein the first conductor and the at least one second conductor are spaced apart from each other, and
a region recessed with a predetermined curvature inward from a side surface of the first substrate is formed adjacent to the first conductor and the at least one second conductor.

7. The communication device of claim 6,
wherein a fastening member vertically inserted through the recessed region is contacted with both of the first conductor and the at least one second conductor while the communication device is inserted into a slot of a second substrate of the external electronic device, and
wherein the first conductor is electrically connected to the at least one second conductor through the fastening member.

8. The communication device of claim 7, further comprising:
a first resistor connected to the power line; and
a first inverter,
wherein the control circuit is an AND logic circuit comprising a first input terminal and a second input terminal,
the first input terminal of the control circuit is connected to the signal line,
the second input terminal of the control circuit is connected to the first resistor connected to the power line through the first inverter and is connected to the first conductor through the first inverter, and
the control circuit is configured to:
receive the first signal from the processor of the external electronic device through the first input terminal, and
receive, through the second input terminal, the second signal of a high level that is generated from the first inverter by discharging the power flowing along the power line to the ground through the first resistor, the first conductor, and the at least one second conductor when the first conductor is electrically connected to the at least one second conductor.

9. The communication device of claim 6, further comprising:
a third conductor disposed on a lower surface of the first substrate and connected to the power line; and
at least one fourth conductor electrically disconnected from the third conductor and connected to the ground,
wherein the control circuit is connected to the third conductor, and
the control circuit is configured to:
receive the first signal from the processor of the external electronic device,
receive the second signal when the first conductor is electrically connected to the at least one second conductor,
receive the third signal generated by discharging the power flowing along the power line to the ground through the at least one fourth conductor when the third conductor is electrically connected to the at least one fourth conductor, and
output, based on the first signal, the second signal, and the third signal, the control signal for controlling the converter circuit to the converter circuit.

10. The communication device of claim 9, wherein, in a state in which the communication device is inserted into a slot of a second substrate of the external electronic device, the third conductor disposed on the lower surface of the substrate is electrically connected to the at least one fourth conductor, based on a conductor of the second substrate of the external electronic device.

11. The communication device of claim 10, further comprising:
a first resistor and a second resistor connected to the power line; and
a first inverter and a second inverter,
wherein the control circuit is an AND logic circuit comprising a first input terminal, a second input terminal, and a third input terminal,
wherein the first input terminal of the control circuit is connected to the signal line,
wherein the second input terminal of the control circuit is connected, through the first inverter, to the first resistor connected to the power line and to the first conductor,
wherein the second input terminal of the control circuit is connected, through the second inverter, to the second resistor connected to the power line and to the third conductor, and
wherein the control circuit is configured to:
receive the first signal from the processor of the external electronic device through the first input terminal,
receive, through the second input terminal, the second signal of a high level that is generated from the first inverter by discharging the power flowing along the power line to the ground through the first resistor, the first conductor, and the at least one second conductor when the first conductor is electrically connected to the at least one second conductor, and
receive, through the second input terminal, the third signal of a high level that is generated from the second inverter by discharging the power flowing along the power line to the ground through the second resistor, the third conductor, and the at least one fourth conductor when the third conductor is electrically connected to the at least one fourth conductor.

12. The communication device of claim 1, wherein the control circuit is configured to receive the first signal from the processor in response to a signal transmitted to the external electronic device, based on electrical connection between the first conductor and the at least one second conductor.

13. A method of operating a communication device insertable into an external electronic device, the method comprising:
receiving a first signal from a processor of the external electronic device through a signal line;
receiving a second signal generated based on a discharging power flowing along a power line to a ground through at least one second conductor when a first conductor is electrically connected to at least one second conductor according to a fastening between the communication device and the external electronic device;

outputting, based on the first signal and the second signal, a control signal to a converter circuit for controlling the converter circuit; and refraining from outputting the control signal for controlling the converter circuit, based on receiving a third signal generated during electrical disconnection between the first conductor and at least one second conductor while receiving the first signal through the signal line.

14. The method of claim 13, wherein, when the communication device is inserted into a slot of a substrate of the external electronic device, the signal line is electrically connected to the processor of the external electronic device, and the power line is electrically connected to a first converter circuit of the external electronic device.

15. The method of claim 14, further comprising:
receiving the power when the power line is electrically connected to the first converter circuit of the external electronic device,
wherein the first signal is received when the signal line is electrically connected to the processor of the external electronic device.

16. The method of claim 15, further comprising:
converting, by the converter circuit based on reception of the control signal, the power received through the power line, and
supplying, by the converter circuit, the converted power to other electrical components of the communication device.

17. The method of claim 13, wherein the communication device is a communication device of an M.2 specification.

18. The method of claim 13, wherein the first signal is received from the processor in response to a signal transmitted to the external electronic device, based on electrical connection between the first conductor and at least one second conductor.

* * * * *